(12) United States Patent
Yamaguchi

(10) Patent No.: US 8,441,739 B2
(45) Date of Patent: May 14, 2013

(54) ZOOM OPTICAL SYSTEM, OPTICAL APPARATUS AND METHOD OF MANUFACTURING ZOOM OPTICAL SYSTEM

(75) Inventor: Satoshi Yamaguchi, Sagamihara (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/441,376

(22) Filed: Apr. 6, 2012

(65) Prior Publication Data
US 2012/0194918 A1 Aug. 2, 2012

Related U.S. Application Data

(63) Continuation of application No. 13/050,005, filed on Mar. 17, 2011, now abandoned.

(30) Foreign Application Priority Data

Mar. 18, 2010 (JP) .................................. 2010-063123

(51) Int. Cl.
*G02B 15/14* (2006.01)
(52) U.S. Cl.
USPC .......................................................... 359/687

(58) Field of Classification Search .................. 359/687, 359/554, 557
See application file for complete search history.

(56) References Cited

U.S. PATENT DOCUMENTS 7,990,624 B2 * 8/2011 Fujisaki ......................... 359/687
2010/0214658 A1 * 8/2010 Ito ................................... 359/557

FOREIGN PATENT DOCUMENTS

JP 2006-201524 A 8/2006

* cited by examiner

*Primary Examiner* — Scott J Sugarman
(74) *Attorney, Agent, or Firm* — Miles & Stockbridge P.C.

(57) ABSTRACT

A zoom optical system includes, in order from its object side along its optical axis, a first lens group G1 having a positive refracting power, a second lens group G2 having a negative refracting power, a third lens group G3 having a positive refracting power, and a fourth lens group G4 having a positive refracting power, wherein at least one of the first, second, third and fourth lens groups G1, G2, G3, G4 comprises a front group having a positive refracting power including at least two lenses and a rear group having a negative refracting power, and during zooming from the wide angle end state W to the telephoto end state T, the distance between the front group and the rear group does not change, and during focusing onto an object, the front group moves along the optical axis.

17 Claims, 14 Drawing Sheets

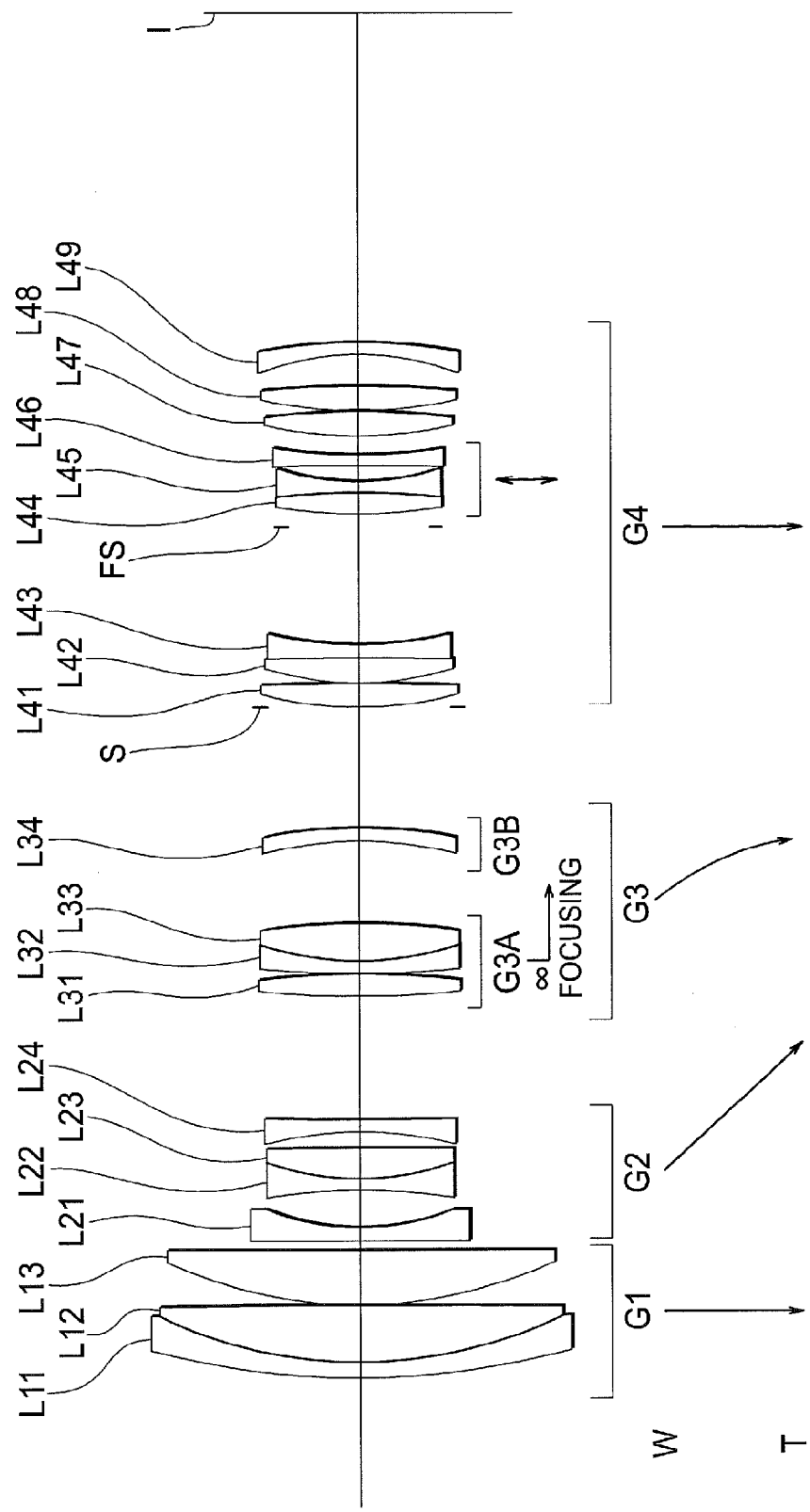

ZOOM OPTICAL SYSTEM, OPTICAL APPARATUS AND METHOD OF MANUFACTURING ZOOM OPTICAL SYSTEM

CROSS-REFERENCE TO RELATED APPLICATION

This application is a continuation of application Ser. No. 13/050,005 filed Mar. 17, 2011 now abandoned. Also, the disclosure of the following priority application is herein incorporated by reference:
Japanese Patent Application No. 2010-063123 filed on Mar. 18, 2010.

BACKGROUND OF THE INVENTION

1. Technical Field

The present invention relates to a zoom optical system, an optical apparatus having the same, and a method of manufacturing a zoom optical system.

2. Background Art

Heretofore, zoom optical systems suitable for use in film cameras, digital still cameras, and video cameras have been developed (see, for example, Japanese Patent Application Laid-Open No. 2006-201524).

Prior art zoom optical systems have not achieved excellent optical performance.

SUMMARY OF THE INVENTION

The present invention has been made in view of the above, and its object is to provide a zoom optical system having excellent optical performance and an optical device having such a zoom optical system, and a method of manufacturing a zoom optical system.

To achieve the above object, according to the present invention, there is provided a zoom optical system comprising, in order from its object side along its optical axis a first lens group having a positive refracting power, a second lens group having a negative refracting power, a third lens group having a positive refracting power, and a fourth lens group having a positive refracting power, wherein at least one of said first, second, third and fourth lens groups comprises a front group having a positive refracting power including at least two lenses and a rear group having a negative refracting power, the distance between said front group and said rear group does not change during zooming from the wide angle end state to the telephoto end state, and said front lens group moves along the optical axis during focusing onto an object.

According to another aspect of the present invention, there is provided an optical apparatus having said zoom optical system.

According to still another aspect of the present invention, there is provided a method of manufacturing a zoom optical system including, in order from its object side along its optical axis, a first lens group having a positive refracting power, a second lens group having a negative refracting power, a third lens group having a positive refracting power and a fourth lens group having a positive refracting power. The method according to the present invention includes constructing at least one of said first, second, third and fourth lens groups with a front group having a positive refracting power including at least two lenses and a rear group having a negative refracting power, arranging said front group and said rear group in such a way that the distance between said front group and said rear group will not change during zooming from the wide angle end state to the telephoto end state, and arranging said front group in such a way as to be movable along the optical axis upon focusing onto an object.

The present invention can provide a zoom optical system having good optical performance, an optical apparatus having the same, and a method of manufacturing a zoom optical system.

BRIEF DESCRIPTION OF THE DRAWINGS

FIG. 1 is a cross sectional view showing the configuration of a zoom optical system according to a first example.

FIG. 2A shows aberrations at the wide angle end of the focal length range, FIG. 2B shows aberrations at an intermediate focal length position, and FIG. 2C shows aberrations at the telephoto end of the focal length range.

FIG. 3A shows aberrations at the wide angle end of the focal length range, and FIG. 3B shows aberrations at the telephoto end of the focal length range.

FIG. 5A shows aberrations at the wide angle end of the focal length range, FIG. 5B shows aberrations at an intermediate focal length position, and FIG. 5C shows aberrations at the telephoto end of the focal length range.

FIG. 6A shows aberrations at the wide angle end of the focal length range, and FIG. 6B shows aberrations at the telephoto end of the focal length range.

FIG. 8A shows aberrations at the wide angle end of the focal length range, FIG. 8B shows aberrations at an intermediate focal length position, and FIG. 8C shows aberrations at the telephoto end of the focal length range.

FIG. 9A shows aberrations at the wide angle end of the focal length range, and FIG. 9B shows aberrations at the telephoto end of the focal length range.

FIG. 11A shows aberrations at the wide angle end of the focal length range, FIG. 11B shows aberrations at an intermediate focal length position, and FIG. 11C shows aberrations at the telephoto end of the focal length range.

FIG. 12A shows aberrations at the wide angle end of the focal length range, and FIG. 12B shows aberrations at the telephoto end of the focal length range.

DETAILED DESCRIPTION

Figure 2A:
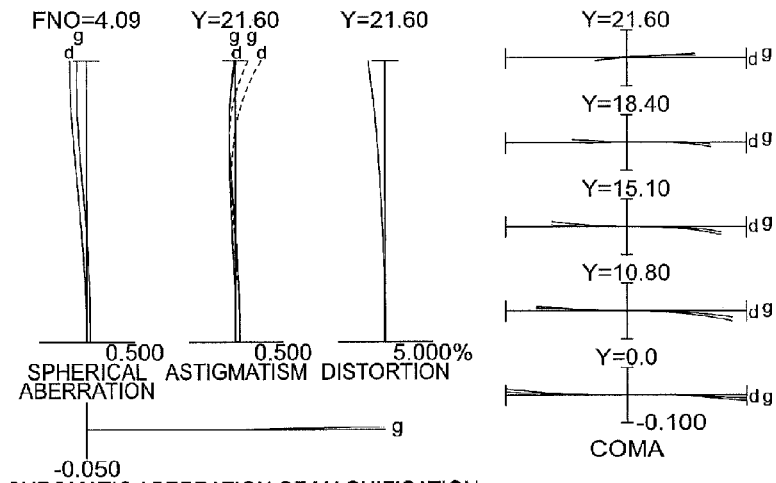
FIGS. 2A, 2B and 2C are aberration diagrams of the zoom optical system according to the first example in the state in which the zoom optical system is focused on an object point at infinity, where

In the following, a zoom optical system according to an embodiment of the present invention will be described.

A zoom optical system according to an embodiment of the invention comprises, in order from its object side along its optical axis, a first lens group having a positive refracting power, a second lens group having a negative refracting power, a third lens group having a positive refracting power, and a fourth lens group having a positive refracting power, wherein at least one of the first, second, third and fourth lens groups comprises a front group having a positive refracting power including at least two lenses and a rear group having a negative refracting power, and during zooming from the wide angle end state to the telephoto end state, the distance between the front group and the rear group does not change, and during focusing onto an object, the front lens group moves along the optical axis.

With the above configuration, the amount of movement of the focusing group upon focusing can be made small. This enables a reduction in the load on the motor and a reduction in the overall optical length. Furthermore, the focusing group can be designed to have an adequate power arrangement without imposing undue burden of power to the entire optical system, and deterioration of the optical performance caused by manufacturing errors can be made smaller. Still further, the change in spherical aberration of the optical system in the telephoto end state can be made small, and excellent optical performance can be achieved even when the optical system is focused on an object at a short distance. Still further, since the distance between the front group and the rear group does not change during zooming, the change in the decentering of the front group and the rear group relative to each other can be made small. This makes deterioration of the optical performance due to manufacturing errors smaller.

In the zoom optical system according to this embodiment, it is preferred that the first lens group be fixed relative to the image plane during zooming from the wide angle end state to the telephoto end state.

This design can make the change in the decentering of the first lens group made small, thereby making deterioration of the optical performance due to manufacturing errors smaller. As the first lens group is not moved during zooming, the overall size of the zoom optical system can be made small.

It is preferred that the zoom optical system according to this embodiment satisfy the following condition (1):

$$0.050 < |fA/fB| < 0.950 \quad (1),$$

where fA is the focal length of the front group, and fB is the focal length of the rear group.

Condition (1) limits the value of the ratio of the focal length of the front group and the focal length of the rear group.

If condition (1) is satisfied, the amount of movement of the front group for focusing can be made small, and excellent correction of the change in aberrations, in particular spherical aberration, at short object distances can be achieved.

If the upper limit of condition (1) is exceeded, the amount of movement of the front group for focusing will be unduly large, leading to a large overall length of the optical system. This is undesirable. In addition, undercorrection of spherical aberration will result.

If the lower limit of condition (1) is exceeded, the refracting power of the front group will be unduly high, leading to overcorrection of spherical aberration. In addition, deterioration in the optical performance due to decentering of the front group and rear group relative to each other will be large when the optical system is focused on an object at a short distance. This is undesirable.

To ensure the advantageous effects of this embodiment, it is preferred that the upper limit of condition (1) be replaced by 0.700. To further ensure the advantageous effects of this embodiment, it is more preferred that the upper limit of condition (1) be replaced by 0.400. To ensure the advantageous effects of this embodiment still further, it is more preferred that the upper limit of condition (1) be replaced by 0.250.

To ensure the advantageous effects of this embodiment, it is preferred that the lower limit of condition (1) be replaced by 0.070. To further ensure the advantageous effects of this embodiment, it is more preferred that the lower limit of condition (1) be replaced by 0.130. To ensure the advantageous effects of this embodiment still further, it is more preferred that the lower limit of condition (1) be replaced by 0.170.

In the zoom optical system according to this embodiment, it is preferred that the lens group located closest to the image side be fixed relative to the image plane during zooming from the wide angle end state to the telephoto end state.

This feature allows a simplification of the zoom mechanism for the entire optical system. In addition, this feature facilitates keeping the F-number constant during zooming and is advantageous for aberration correction.

In the zoom optical system according to this embodiment, it is preferred that at least a part of the fourth lens group be movable with a movement component in a direction perpendicular to the optical axis.

This feature allows a simplification and a weight reduction of a vibration reduction mechanism for compensating hand shake.

It is preferred that the zoom optical system according to this embodiment satisfy the following condition (2):

$$0.050 < |fA/fX| < 0.950 \quad (2),$$

where fA is the focal length of the front group, and fX is the focal length of the above-mentioned at least one lens group.

Condition (2) limits the ratio of the focal length of the front group and the above-mentioned at least one lens group.

If condition (2) is satisfied, the amount of movement of the front group for focusing can be made small, and aberrations, in particular the change in spherical aberration, can be corrected excellently when the optical system is focused at an object at a short distance.

If the upper limit of condition (2) is exceeded, the amount of movement of the front group for focusing will be unduly large, leading to an undesirably large overall length of the zoom optical system. In addition, undercorrection of spherical aberration will result.

If the lower limit of condition (2) is exceeded, the refracting power of the front group will be unduly high, leading to overcorrection of spherical aberration. In addition, a deterioration in the optical performance caused by decentering of the front group and the rear group relative to each other will become large when the optical system is focused at an object at a short distance. This is undesirable.

To ensure the advantageous effects of this embodiment, it is preferred that the upper limit of condition (2) be replaced by 0.920. To further ensure the advantageous effects of this embodiment, it is more preferred that the upper limit of condition (2) be replaced by 0.880. To ensure the advantageous effects of this embodiment still further, it is more preferred that the upper limit of condition (2) be replaced by 0.850.

To ensure the advantageous effects of this embodiment, it is preferred that the lower limit of condition (2) be replaced by 0.200. To further ensure the advantageous effects of this embodiment, it is more preferred that the lower limit of condition (2) be replaced by 0.500. To ensure the advantageous effects of this embodiment still further, it is more preferred that the lower limit of condition (2) be replaced by 0.800.

It is preferred that the zoom optical system according to this embodiment satisfy the following condition (3):

$$1.200 < |fB/fX| < 50.000 \tag{3},$$

where fB is the focal length of the rear group, and fX is the focal length of the above-mentioned at least one lens group.

Condition (3) limits the ratio of the focal length of the rear group and the above-mentioned at least one lens group.

If condition (3) is satisfied, the overall length of the optical system can made small, and aberrations, in particular the change in spherical aberration, can be corrected excellently when the optical system is focused at an object at a short distance.

If the upper limit of condition (3) is exceeded, the refracting power of the front group will be unduly high, leading to overcorrection of spherical aberration. In addition, a deterioration in the optical performance caused by decentering of the front group and the rear group relative to each other will become large when the optical system is focused at an object at a short distance. This is undesirable.

If the lower limit of condition (3) is exceeded, the amount of movement of the front group for focusing will be unduly large, leading to an undesirably large overall length of the zoom optical system. In addition, undercorrection of spherical aberration will result.

To ensure the advantageous effects of this embodiment, it is preferred that the upper limit of condition (3) be replaced by 25.000. To further ensure the advantageous effects of this embodiment, it is more preferred that the upper limit of condition (3) be replaced by 10.000. To ensure the advantageous effects of this embodiment still further, it is more preferred that the upper limit of condition (3) be replaced by 5.000.

To ensure the advantageous effects of this embodiment, it is preferred that the lower limit of condition (3) be replaced by 1.500. To further ensure the advantageous effects of this embodiment, it is more preferred that the lower limit of condition (3) be replaced by 2.500. To ensure the advantageous effects of this embodiment still further, it is more preferred that the lower limit of condition (3) be replaced by 3.500.

In the zoom optical system according to this embodiment, the lens group composed of the front group and the rear group be the third lens group.

If this is the case, the outer diameter of the focusing group can be made small, and a reduction in the weight can be achieved. In addition, good optical performance can be achieved even when the optical system is focused on an object at a short distance.

In the zoom optical system according to this embodiment, the lens group composed of the front group and the rear group be the first lens group.

If this is the case, the change in the focal length with focusing operation can be made small, and the imaging magnification of an object at short distance can be made large.

In the zoom optical system according to this embodiment, it is preferred that the front group include at least one positive lens and at least one negative lens.

With this feature, curvature of field, spherical aberration and chromatic aberration at the time when the optical system is focused on an object at a short distance can be made small. Therefore, good optical performance can be achieved even at the time when the optical system is focused on an object at a short distance.

In the zoom optical system according to this embodiment, it is preferred that during zooming from the wide angle end state to the telephoto end state, the distance between the first lens group and the second lens group increase, the distance between the second lens group and the third lens group change, and the distance between the third lens group and the fourth lens group change.

With this feature, the change in spherical aberration can be made small.

In the following, examples according to the aforementioned embodiment will be described with reference to the drawings.

First Example

FIG. 1 is a cross sectional view showing the configuration of a zoom optical system according to a first example.

As shown in FIG. 1, the zoom optical system according to the first example includes, in order from its object side along its optical axis, a first lens group G1 having a positive refracting power, a second lens group G2 having a negative refracting power, a third lens group G3 having a positive refracting power, and a fourth lens group G4 having a positive refracting power. The third lens group G3 is composed of a front group G3A having a positive refracting power and a rear group G3B having a negative refracting power. An aperture stop S is provided in the fourth lens group G4, and the aperture stop S is the element that is located closest to the object side in the fourth lens group G4.

During zooming from the wide angle end state W to the telephoto end state T, the first lens group G1 is fixed, the second lens group G2 moves monotonically toward the image side, the third lens group G3 moves, and the fourth lens group G4 is fixed, relative to the image plane I so that the distance between the first lens group G1 and the second lens group G2 increases, that the distance between the second lens group G2 and the third lens group G3 changes, and that the distance between the third lens group G3 and the fourth lens group G4 changes. In addition, during zooming from the wide angle end state W to the telephoto end state T, the distance between the front group G3A in the third lens group G3 and the rear group G3B in the third lens group G3 does not change.

Focusing operation from an object at infinity to an object at a short distance is performed by moving the front group G3A in the third lens group G3 toward the image side along the optical axis.

The first lens group G1 includes, in order from the object side along the optical axis, a cemented lens made up of a negative meniscus lens L11 having a convex surface facing the object side and a biconvex lens L12, and a positive meniscus lens L13 having a convex surface facing the object side.

The second lens group G2 includes, in order from the object side along the optical axis, a negative meniscus lens L21 having a convex surface facing the object side, a cemented lens made up of a biconcave lens L22 and a biconvex lens L23, and a biconcave lens L24.

The front group G3A in the third lens group G3 includes, in order from the object side along the optical axis, a biconvex lens L31, and a cemented lens made up of a negative meniscus lens L32 having a convex surface facing the object side and a biconvex lens L33.

The rear group G3B in the third lens group G3 includes a negative meniscus lens L34 having a concave surface facing the object side.

The fourth lens group G4 includes, in order from the object side along the optical axis, a biconvex lens L41, a cemented lens made up of a biconvex lens L42 and a biconcave lens L43, a fixed stop FS, a cemented lens made up of a biconvex lens L44 and a biconcave lens L45, a biconcave lens L46, a biconvex lens L47, a biconvex lens L48, and a negative meniscus lens L49 having a concave surface facing the object side. The rays emerging from the negative meniscus lens L49 are focused on the image plane I.

The image plane I is arranged on an image pickup element (not shown), which may be, for example, a CCD or CMOS sensor. This applies also to all the examples described in the following.

Hand-shake compensation (or vibration reduction) is provided by moving a portion of the fourth lens group G4 or the cemented lens made up of the biconvex lens L44 and the biconcave lens L45 and the biconcave lens L46 in such a way as to have a movement component in a direction perpendicular to the optical axis.

Numerical data for the zoom optical system according to the first example is presented in Table 1 below.

In the surface data in the table, "OP" refers to the object plane, "SN" stands for "surface number" representing the ordinal position of a lens surface counted from the object side, "r" is the radius of curvature, "d" is the surface distance, "nd" is the refractive index with respect to the d-line (having a wavelength λ of 587.6 nm), "vd" is the Abbe number with respect to the d-line (having a wavelength λ of 587.6), "OS" refers to the object surface, "variable" refers to a variable surface distance, "stop" refers to an aperture stop S, and "IP" refers to the image plane I. The refractive index nd of air (which is equal to 1.000000) is not shown. The sign "∞" in the radius of curvature r represents that the corresponding surface is a flat surface.

In the "Aspheric Surface Data" section, aspheric surfaces are represented by the following equation:

$$X(y)=(y^2/r)/[1+[1-k(y^2/r^2)]^{1/2}]+A4\times y^4+A6\times y^6$$

where y is the height from the optical axis in directions perpendicular to the optical axis, X(y) is the displacement in the optical axis direction at height y (or the distance between the tangential plane of each aspheric surface at its vertex and a point on the aspheric surface along the optical axis), r is the radius of curvature of a base sphere (or the paraxial radius of curvature), k is the conic constant, and An is the n-th order aspheric coefficient. The expression "E-n" stands for "×10$^{-n}$", for example, "1.234E-05" stands for "1.234×10$^{-5}$". Aspheric surfaces are marked by asterisk "*" suffixed to there surface numbers in the surface data.

In the "Various Data" section, the zoom ratio refers to the magnification changing ratio of the zoom optical system, "W" stands for the wide angle end state, "M" stands for an intermediate focal length state, "T" stands for the telephoto end state, "f" is the focal length of the entire lens system, "FNO" is the F-number, "ω" is half the angle of view (in degrees), "Y" is the image height, "TL" is the overall length of the lens system or the distance from the surface closest to the object side in the first lens group G1 to the image plane I in the state in which the lens system is focused at an object at infinity, "Bf" is the back focus, and "di" is the value of the variable surface distance for the surface with surface number i.

In the "Data for Short Object Distance" section, "W" stands for the wide angle end state, "M" stands for an intermediate focal length state, "T" stands for the telephoto end state, "β" is the image magnification in the state in which the lens system is focused on an object at a short distance, "d0" is the distance from the object to the lens surface closest to the object side, and "di" is the value of the variable surface distance for the surface with surface number i.

In the "Data of Zoom Lens Group" section, the surface number of the first (or frontmost) lens surface (FLS) in each lens group and the focal length (FL) of each lens group are presented.

In the "Values Associated with Conditions" section, values associated with conditions are presented.

In all the numerical data presented in the following, the values of the focal length f, the radius of curvature r, the surface distance and other lengths are in millimeters, unless stated otherwise. However, since scaled-up and scaled-down optical systems can also achieve similar optical performance, the dimensions are not limited to those presented in the following. The unit of the values is not limited to millimeters, but other appropriate units may be used. The above description of the symbols also applies to the other example that will be described in the following.

TABLE 1

(Surface Data)

| SN | r | d | nd | vd |
|---|---|---|---|---|
| OP | ∞ | ∞ | | |
| 1 | 107.5999 | 2.5000 | 1.833378 | 33.17 |
| 2 | 62.4829 | 8.8000 | 1.497820 | 82.52 |
| 3 | −3786.7547 | 0.1000 | | |
| 4 | 62.1920 | 8.5000 | 1.497820 | 82.52 |
| 5 | 2842.4167 | (variable) | | |
| 6 | 2570.3752 | 2.0000 | 1.824372 | 41.37 |
| 7 | 33.8242 | 5.9498 | | |
| 8 | −74.3443 | 1.8000 | 1.488625 | 71.58 |
| 9 | 36.7151 | 4.7771 | 1.846660 | 23.78 |
| 10 | −780.6979 | 2.6316 | | |
| 11 | −49.1692 | 1.8000 | 1.729157 | 54.66 |
| 12 | 487.4476 | (variable) | | |
| 13 | 133.3716 | 3.4283 | 1.729157 | 54.66 |
| 14 | −119.7323 | 0.1000 | | |
| 15 | 146.3097 | 2.0000 | 1.834000 | 37.16 |
| 16 | 42.6439 | 5.9000 | 1.603001 | 65.46 |
| 17 | −89.8556 | (variable) | | |
| 18 | −50.0000 | 2.0000 | 1.761705 | 29.19 |
| 19 | −69.7595 | (variable) | | |
| 20 (stop) | ∞ | 0.0000 | | |
| 21 | 52.0128 | 3.7289 | 1.716445 | 55.44 |
| 22 | −358.6198 | 0.1000 | | |
| 23 | 44.5918 | 4.0000 | 1.497820 | 82.52 |
| 24 | −375.0581 | 2.0000 | 1.849814 | 30.97 |
| 25 | 50.7950 | 18.7122 | | |
| 26 | ∞ | 2.0000 | | |
| 27 | 69.5944 | 3.4000 | 1.808090 | 22.79 |
| 28 | −100.4799 | 1.6000 | 1.657677 | 54.98 |
| 29 | 34.2068 | 2.6410 | | |
| 30 | −346.1430 | 1.6000 | 1.841009 | 30.09 |
| 31 | 70.2413 | 3.0000 | | |
| 32 | 55.6811 | 3.9000 | 1.514739 | 64.49 |
| 33 | −95.4983 | 0.1000 | | |
| 34 | 59.3918 | 3.9000 | 1.514062 | 64.62 |
| 35 | −131.7941 | 4.9899 | | |
| 36 | −37.0818 | 1.9000 | 1.800999 | 34.96 |
| 37 | −73.3082 | (Bf) | | |
| IP | ∞ | | | |

TABLE 1-continued (Various Data)
zoom ratio: 2.745

|   | W | M | T |
|---|---|---|---|
| f = | 71.40 | 107.00 | 195.99 |
| FNO = | 4.1 | 4.1 | 4.1 |
| ω = | 17.107 | 11.288 | 6.107 |
| Y = | 21.6 | 21.5 | 21.6 |
| TL = | 214.6 | 214.5 | 214.8 |
| Bf = | 51.9 | 51.8 | 52.1 |
| d5 | 1.500 | 20.365 | 37.947 |
| d12 | 19.359 | 14.159 | 0.800 |
| d17 | 13.065 | 13.065 | 13.065 |
| d19 | 18.897 | 5.232 | 0.800 |

(Data for Short Object Distance)

|   | W | M | T |
|---|---|---|---|
| β | −0.07 | −0.09 | −0.14 |
| d0 | 974.91 | 975.02 | 974.94 |
| d5 | 1.500 | 20.365 | 37.947 |
| d12 | 21.152 | 17.825 | 11.097 |
| d17 | 11.272 | 9.398 | 2.778 |
| d19 | 18.897 | 5.232 | 0.800 |

(Data of Zoom Lens Group)

| Group | FLS | FL |
|---|---|---|
| 1 | 1 | 98.012 |
| 2 | 6 | −25.197 |
| 3 | 13 | 66.600 |
| 3A | 13 | 55.298 |
| 3B | 18 | −242.351 |
| 4 | 20 | 97.939 |

(Values Associated with Conditions)

(1) |fA/fB| = 0.228
(2) |fA/fX| = 0.830
(3) |fB/fX| = 3.639

Figure 2B:
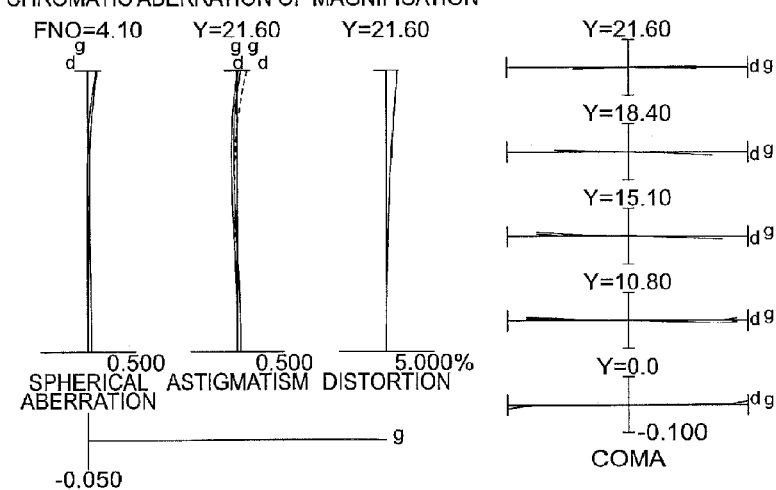
Figure 2C:
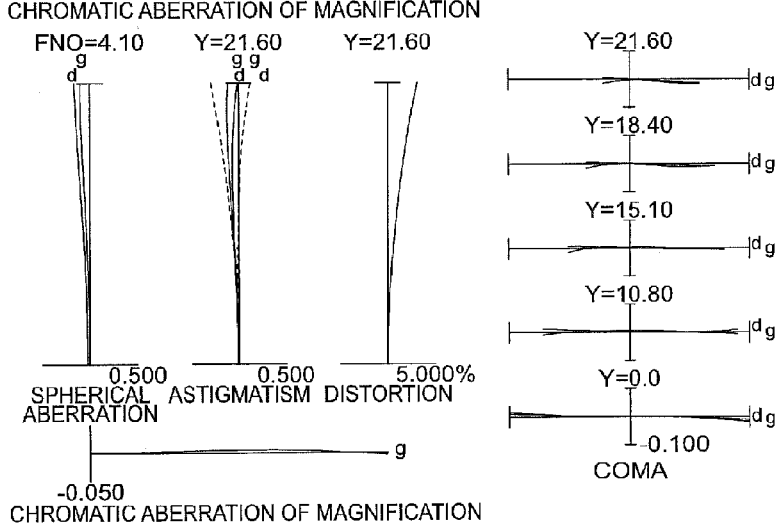

FIGS. 2A, 2B and 2C show aberrations of the zoom optical system according to the first example in the state in which the optical system is focused on an object point at infinity, where FIG. 2A shows aberrations at the wide angle end of the focal length range, FIG. 2B shows aberrations at the intermediate focal length position, and FIG. 2C shows aberrations at the telephoto end of the focal length range.

Figure 3A:
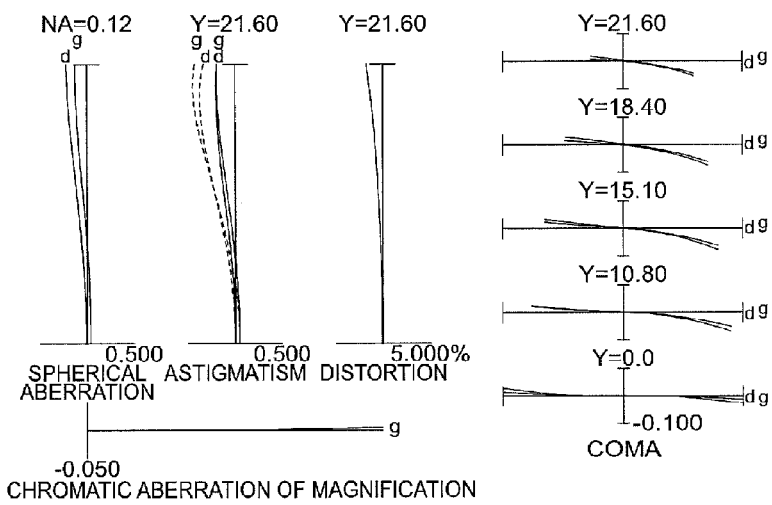
FIGS. 3A and 3B show aberrations of the zoom optical system according to the first example in the state in which the optical system is focused on an object point at a short distance, where
Figure 3B:
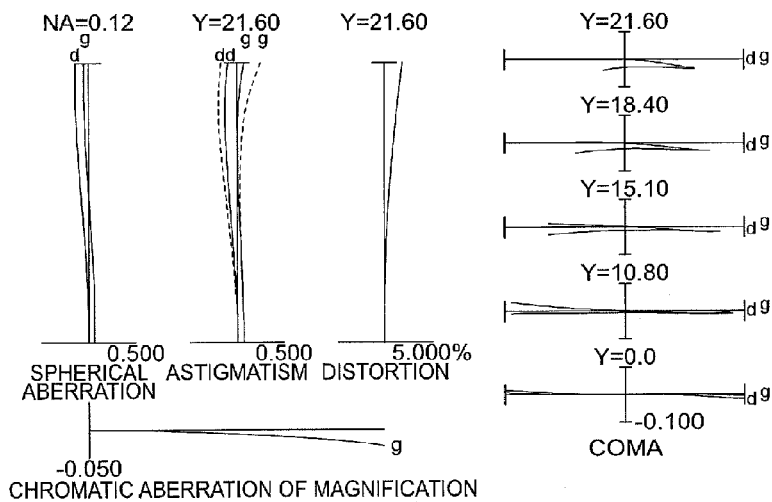

FIGS. 3A and 3B show aberrations of the zoom optical system according to the first example in the state in which the optical system is focused on an object point at a short distance, where FIG. 3A shows aberrations at the wide angle end of the focal length range, and FIG. 3B shows aberrations at the telephoto end of the focal length range.

In the aberration diagrams, FNO is the F-number FNO, Y is the image height Y, and NA is the numerical aperture. Curves d represent aberrations with respect to the d-line (having a wavelength of 587.6 nm), curves g represent aberrations with respect to the g-line (having a wavelength of 435.8 nm), and curves with no denotation also represent aberrations with respect to the d-line. In the diagrams of astigmatism, the solid lines represent the sagittal image surface and the broken lines represent the meridional image surface.

Like symbols will also be used in the examples described in the following to eliminate redundant description.

From the aberration diagrams, it can be seen that aberrations of the zoom optical system according to the first example are excellently corrected throughout the focal length range from the wide angle end to the telephoto end, and excellent optical performance is achieved.

Second Example

Figure 4:
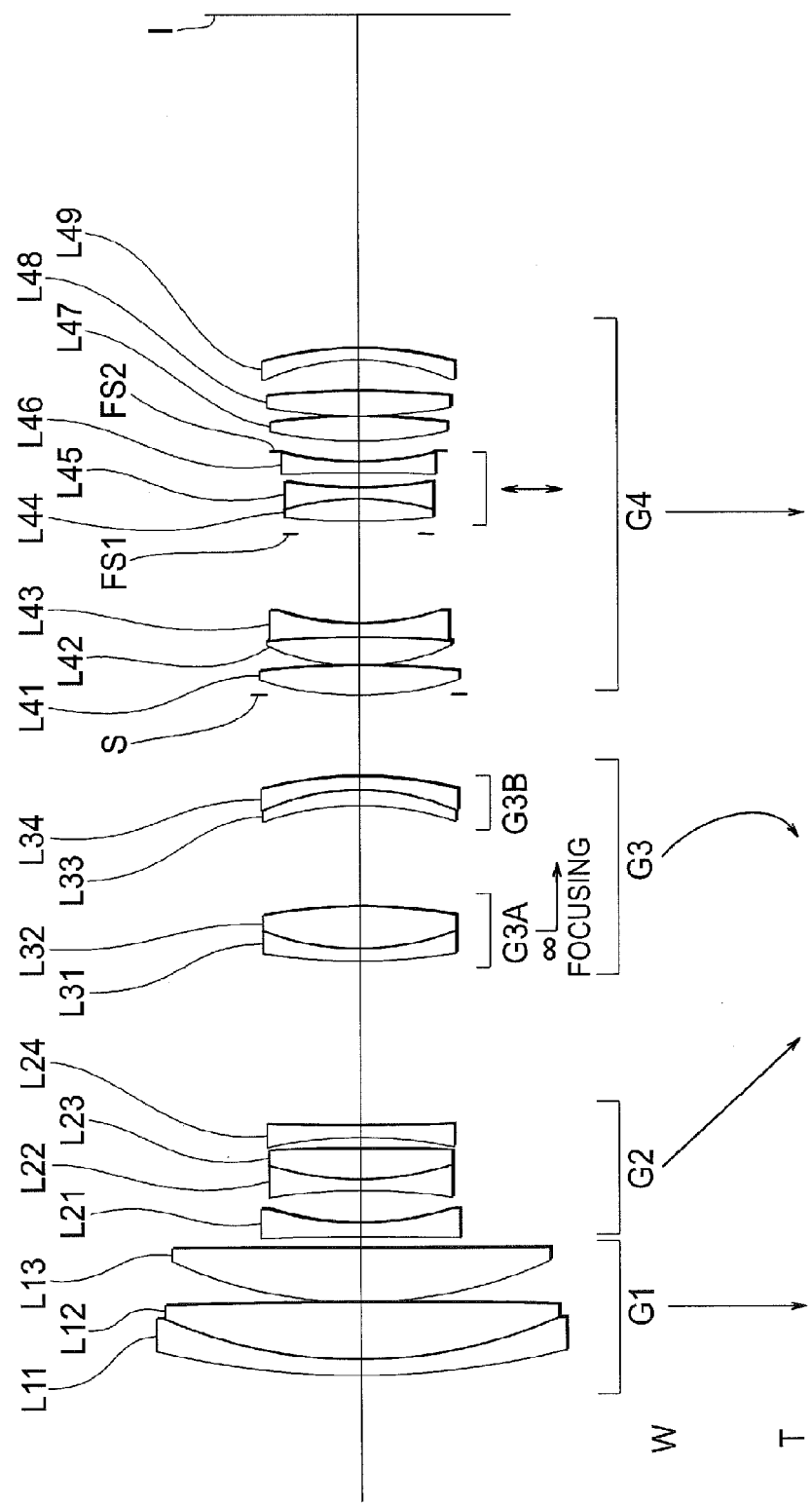
FIG. 4 is a cross sectional view showing the configuration of a zoom optical system according to a second example.

FIG. 4 is a cross sectional view showing the configuration of a zoom optical system according to a second example.

As shown in FIG. 4, the zoom optical system according to the second example includes, in order from its object side along its optical axis, a first lens group G1 having a positive refracting power, a second lens group G2 having a negative refracting power, a third lens group G3 having a positive refracting power, and a fourth lens group G4 having a positive refracting power. The third lens group G3 is composed of a front group G3A having a positive refracting power and a rear group G3B having a negative refracting power. An aperture stop S is provided in the fourth lens group G4, and the aperture stop S is the element that is located closest to the object side in the fourth lens group G4.

During zooming from the wide angle end state W to the telephoto end state T, the first lens group G1 is fixed, the second lens group G2 moves monotonically toward the image side, the third lens group G3 moves, and the fourth lens group G4 is fixed, relative to the image plane I so that the distance between the first lens group G1 and the second lens group G2 increases, that the distance between the second lens group G2 and the third lens group G3 changes, and that the distance between the third lens group G3 and the fourth lens group G4 changes. In addition, during zooming from the wide angle end state W to the telephoto end state T, the distance between the front group G3A in the third lens group G3 and the rear group G3B in the third lens group G3 does not change.

Focusing operation from an object at infinity to an object at a short distance is performed by moving the front group G3A in the third lens group G3 toward the image side along the optical axis.

The first lens group G1 includes, in order from the object side along the optical axis, a cemented lens made up of a negative meniscus lens L11 having a convex surface facing the object side and a biconvex lens L12, and a positive meniscus lens L13 having a convex surface facing the object side.

The second lens group G2 includes, in order from the object side along the optical axis, a biconcave lens L21, a cemented lens made up of a biconcave lens L22 and a biconvex lens L23, and a biconcave lens L24.

The front group G3A in the third lens group G3 includes a cemented lens made up of a negative meniscus lens L31 having a convex surface facing the object side and a biconvex lens L32, which are arranged in order from the object side along the optical axis.

The rear group G3B in the third lens group G3 includes a cemented lens made up of a positive meniscus lens L33 having a concave surface facing the object side and a negative meniscus lens L34 having a concave surface facing the object side, which are arranged in order from the object side along the optical axis.

The fourth lens group G4 includes, in order from the object side along the optical axis, a biconvex lens L41, a cemented lens made up of a biconvex lens L42 and a biconcave lens L43, a first fixed stop FS1, a cemented lens made up of a biconvex lens L44 and a biconcave lens L45, a biconcave lens L46, a second fixed stop FS2, a biconvex lens L47, a biconvex lens L48, and a negative meniscus lens L49 having a concave surface facing the object side. The rays emerging from the negative meniscus lens L49 are focused on the image plane I.

Hand-shake compensation (or vibration reduction) is provided by moving a portion of the fourth lens group G4 or the cemented lens made up of the biconvex lens L44 and the biconcave lens L45 and the biconcave lens L46 in such a way as to have a movement component in a direction perpendicular to the optical axis.

Numerical data for the zoom optical system according to the second example is presented in Table 2 below.

TABLE 2

(Surface Data)

| SN | r | d | nd | vd |
|---|---|---|---|---|
| OP | ∞ | ∞ | | |
| 1 | 119.0272 | 2.5000 | 1.850239 | 32.28 |
| 2 | 68.7833 | 8.8000 | 1.497820 | 82.52 |
| 3 | −1818.7811 | 0.1000 | | |
| 4 | 64.3055 | 8.5000 | 1.497820 | 82.52 |
| 5 | 11508.8650 | (variable) | | |
| 6 | −379.9571 | 2.0000 | 1.834686 | 41.78 |
| 7 | 41.3382 | 5.2354 | | |
| 8 | −83.4183 | 1.8000 | 1.496012 | 70.17 |
| 9 | 41.6721 | 4.8071 | 1.846660 | 23.78 |
| 10 | −256.8116 | 1.7266 | | |
| 11 | −64.7335 | 1.8000 | 1.816000 | 46.62 |
| 12 | 299.1015 | (variable) | | |
| 13 | 83.7734 | 2.0000 | 1.834000 | 37.16 |
| 14 | 37.7766 | 6.6162 | 1.667767 | 57.98 |
| 15 | −74.3595 | (variable) | | |
| 16 | −41.1604 | 2.5000 | 1.774638 | 33.11 |
| 17 | −32.5471 | 2.0000 | 1.688932 | 30.87 |
| 18 | −54.8952 | (variable) | | |
| 19 (stop) | ∞ | 0.0000 | | |
| 20 | 45.9764 | 4.6261 | 1.718637 | 51.17 |
| 21 | −165.7976 | 0.1000 | | |
| 22 | 31.4873 | 4.5489 | 1.497820 | 82.52 |
| 23 | −151.4615 | 2.0000 | 1.850260 | 32.35 |
| 24 | 34.3531 | 14.2150 | | |
| 25 | ∞ | 2.0000 | | |
| 26 | 98.7847 | 3.6116 | 1.775455 | 23.76 |
| 27 | −36.5164 | 1.6000 | 1.696797 | 55.52 |
| 28 | 57.3439 | 2.5204 | | |
| 29 | −222.2566 | 1.6000 | 1.841287 | 29.70 |
| 30 | 45.4216 | 1.7957 | | |
| 31 | ∞ | 1.5000 | | |
| 32 | 55.9523 | 3.9000 | 1.512753 | 64.87 |
| 33 | −95.7605 | 0.1000 | | |
| 34 | 70.3942 | 3.9000 | 1.512367 | 64.95 |
| 35 | −128.2012 | 5.0000 | | |
| 36 | −32.2481 | 1.9000 | 1.800999 | 34.96 |
| 37 | −48.1025 | (Bf) | | |
| IP | ∞ | | | |

(various data)
Zoom ratio: 2.746

| | W | M | T |
|---|---|---|---|
| f = | 71.40 | 107.00 | 196.00 |
| FNO = | 4.2 | 4.2 | 4.2 |
| ω = | 17.230 | 11.311 | 6.089 |
| Y = | 21.6 | 21.6 | 21.6 |
| TL = | 214.8 | 214.6 | 214.7 |
| Bf = | 52.8 | 52.6 | 52.7 |
| d5 | 1.840 | 20.803 | 38.591 |
| d12 | 25.924 | 19.084 | 1.135 |
| d15 | 16.066 | 16.066 | 16.066 |
| d18 | 12.762 | 0.638 | 0.800 |

(Data for Short Object Distance)

| | W | M | T |
|---|---|---|---|
| β | −0.04 | −0.05 | −0.09 |
| d0 | 1785.25 | 1785.43 | 1785.36 |
| d5 | 1.840 | 20.803 | 38.591 |
| d12 | 27.329 | 22.044 | 10.057 |
| d15 | 14.660 | 13.106 | 7.144 |
| d18 | 12.762 | 0.638 | 0.800 |

TABLE 2-continued (Data for Zoom Lens Group)

| Group | FLS | FL |
|---|---|---|
| 1 | 1 | 101.340 |
| 2 | 6 | −29.089 |
| 3 | 13 | 86.501 |
| 3A | 13 | 69.999 |
| 3B | 16 | −333.927 |
| 4 | 19 | 99.569 |

(values Associated with Conditions)

(1) |fA/fB| = 0.210
(2) |fA/fX| = 0.809
(3) |fB/fX| = 3.860

Figure 5A:
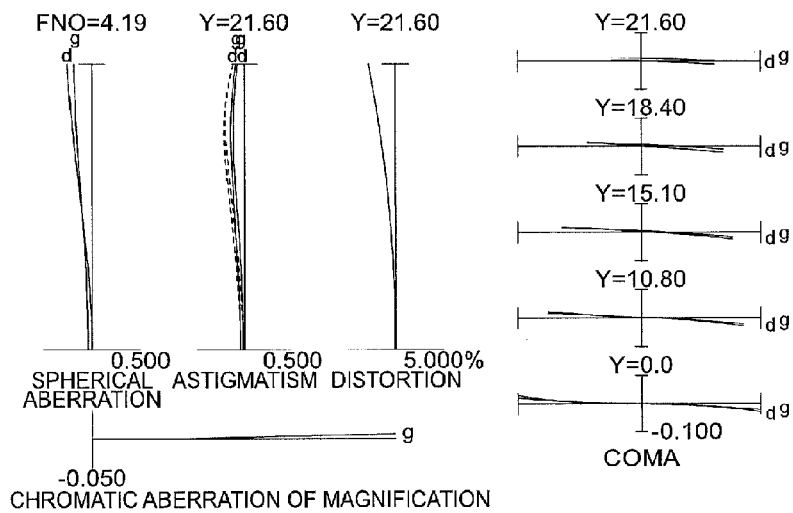
FIGS. 5A, 5B and 5C are aberration diagrams of the zoom optical system according to the second example in the state in which the zoom optical system is focused on an object point at infinity, where
Figure 5B:
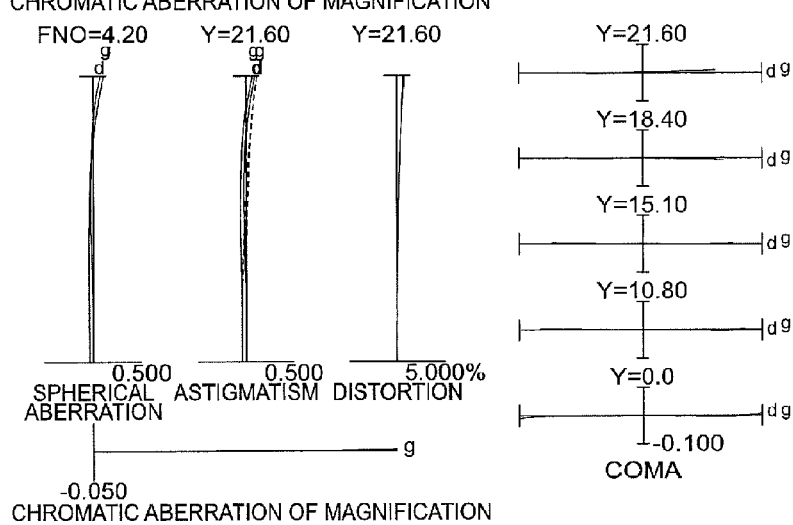
Figure 5C:
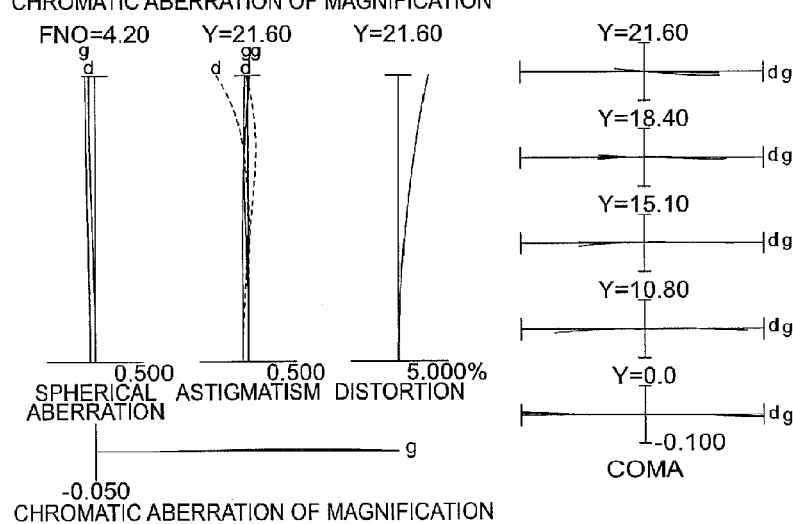

FIGS. 5A, 5B and 5C show aberrations of the zoom optical system according to the second example in the state in which the optical system is focused on an object point at infinity, where FIG. 5A shows aberrations at the wide angle end of the focal length range, FIG. 5B shows aberrations at the intermediate focal length position, and FIG. 5C shows aberrations at the telephoto end of the focal length range.

Figure 6A:
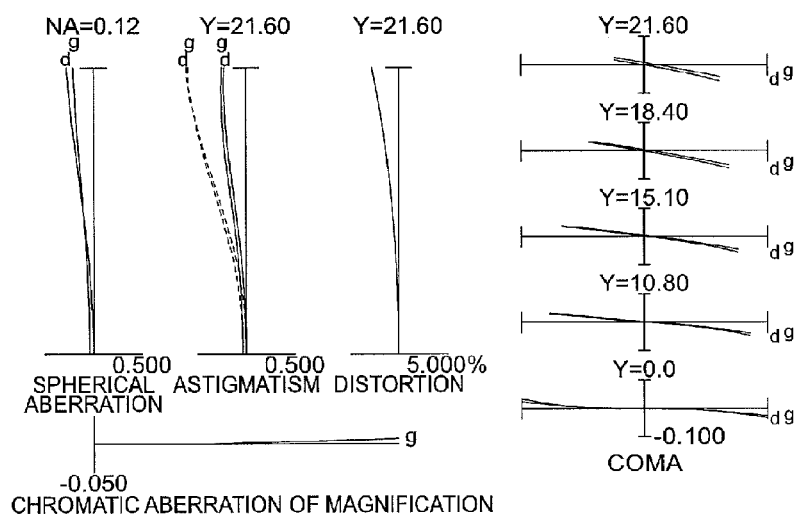
FIGS. 6A and 6B show aberrations of the zoom optical system according to the second example in the state in which the optical system is focused on an object point at a short distance, where
Figure 6B:
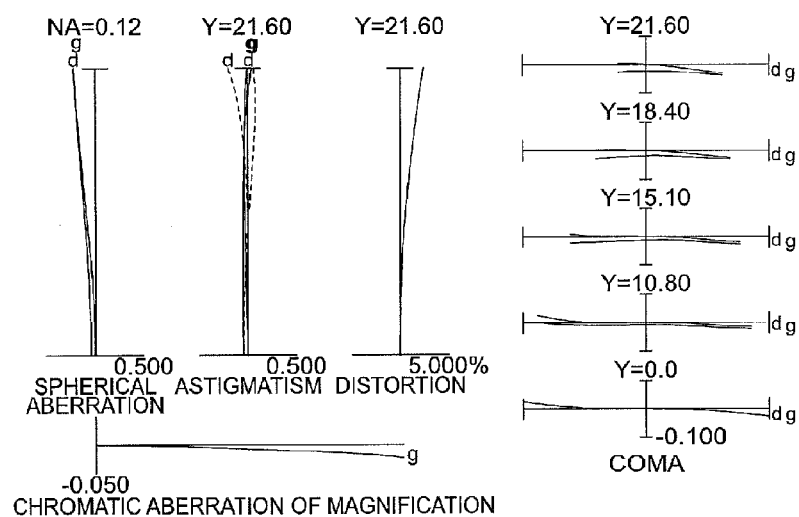

FIGS. 6A and 6B show aberrations of the zoom optical system according to the second example in the state in which the optical system is focused on an object point at a short distance, where FIG. 6A shows aberrations at the wide angle end of the focal length range, and FIG. 6B shows aberrations at the telephoto end of the focal length range.

From the aberration diagrams, it can be seen that aberrations of the zoom optical system according to the first example are excellently corrected throughout the focal length range from the wide angle end to the telephoto end, and excellent optical performance is achieved.

Third Example

Figure 7:
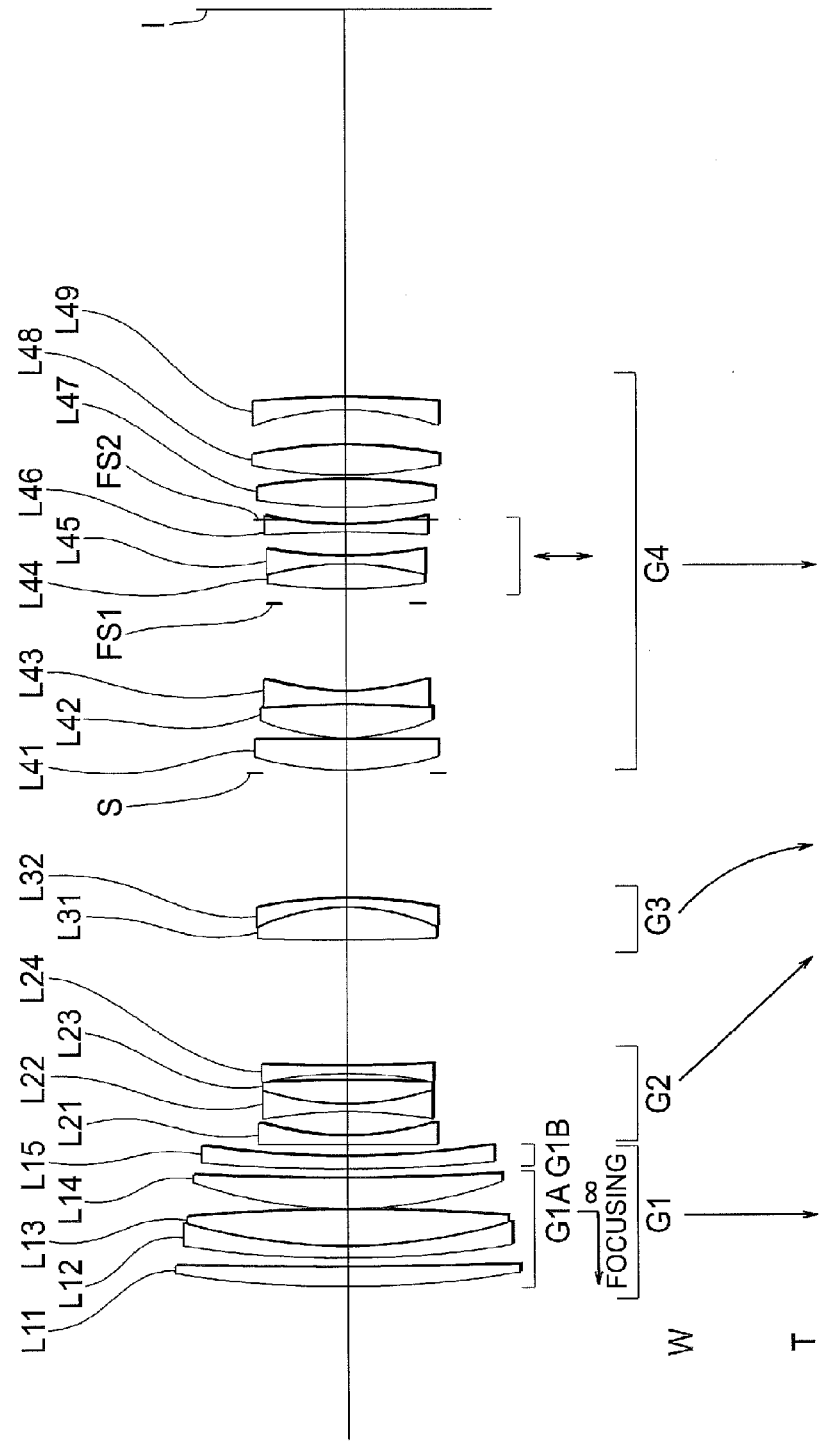
FIG. 7 is a cross sectional view showing the configuration of a zoom optical system according to a third example.

FIG. 7 is a cross sectional view showing the configuration of a zoom optical system according to a third example.

As shown in FIG. 7, the zoom optical system according to the third example includes, in order from its object side along its optical axis, a first lens group G1 having a positive refracting power, a second lens group G2 having a negative refracting power, a third lens group G3 having a positive refracting power, and a fourth lens group G4 having a positive refracting power. The first lens group G1 is composed of a front group G1A having a positive refracting power and a rear group G1B having a negative refracting power. An aperture stop S is provided in the fourth lens group G4, and the aperture stop S is the element that is located closest to the object side in the fourth lens group G4.

During zooming from the wide angle end state W to the telephoto end state T, the first lens group G1 is fixed, the second lens group G2 moves monotonically toward the image side, the third lens group G3 moves, and the fourth lens group G4 is fixed, relative to the image plane I so that the distance between the first lens group G1 and the second lens group G2 increases, that the distance between the second lens group G2 and the third lens group G3 changes, and that the distance between the third lens group G3 and the fourth lens group G4 changes. In addition, during zooming from the wide angle end state W to the telephoto end state T, the distance between the front group G1A in the first lens group G1 and the rear group G1B in the first lens group G1 does not change.

Focusing operation from an object at infinity to an object at a short distance is performed by moving the front group G1A in the first lens group G1 toward the object side along the optical axis.

The front group G1A in the first lens group G1 includes, in order from the object side along the optical axis, a positive meniscus lens L11 having a convex surface facing the object side, a cemented lens made up of a negative meniscus lens L12 having a convex surface facing the object side and a biconvex lens L13, and a positive meniscus lens L14 having a convex surface facing the object side.

The rear group G1B in the first lens group G1 includes a negative meniscus lens L15 having a convex surface facing the object side.

The second lens group G2 includes, in order from the object side along the optical axis, a biconcave lens L21, a cemented lens made up of a biconcave lens L22 and a biconvex lens L23, and a biconcave lens L24. The biconcave lens L21 is a glass mold aspheric lens having an aspheric image side lens surface.

The third lens group G3 includes a cemented lens made up of a biconvex lens L31 and a negative meniscus lens L32 having a concave surface facing the object side, which are arranged in order from the object side along the optical axis.

The fourth lens group G4 includes, in order from the object side along the optical axis, a positive meniscus lens L41 having a convex surface facing the object side, a cemented lens made up of a biconvex lens L42 and a biconcave lens L43, a first fixed stop FS1, a cemented lens made up of a biconvex lens L44 and a biconcave lens L45, a biconcave lens L46, a second fixed stop FS2, a biconvex lens L47, a biconvex lens L48, and a negative meniscus lens L49 having a concave surface facing the object side. The rays emerging from the negative meniscus lens L49 are focused on the image plane I.

Hand-shake compensation (or vibration reduction) is provided by moving a portion of the fourth lens group G4 or the cemented lens made up of the biconvex lens L44 and the biconcave lens L45 and the biconcave lens L46 in such a way as to have a movement component in a direction perpendicular to the optical axis.

Numerical data for the zoom optical system according to the third example is presented in Table 3 below.

TABLE 3

(Surface Data)

| SN | r | d | nd | νd |
|---|---|---|---|---|
| OP | ∞ | ∞ | | |
| 1 | 166.2990 | 3.1000 | 1.487490 | 70.40 |
| 2 | 875.3645 | 1.5000 | | |
| 3 | 152.4026 | 2.0000 | 1.903660 | 31.27 |
| 4 | 83.2796 | 5.9000 | 1.497820 | 82.52 |
| 5 | −295.6182 | 0.1000 | | |
| 6 | 67.8904 | 5.0000 | 1.497820 | 82.52 |
| 7 | 445.0552 | (variable) | | |
| 8 | 252.9956 | 2.0000 | 1.638731 | 56.93 |
| 9 | 140.7312 | (variable) | | |
| 10 | −1759.9066 | 1.4500 | 1.820800 | 42.60 |
| 11* | 42.2575 | 4.0493 | | |
| 12 | −69.0136 | 1.2500 | 1.603001 | 65.46 |
| 13 | 40.1840 | 3.8171 | 1.846660 | 23.78 |
| 14 | −276.1554 | 1.1764 | | |
| 15 | −62.0184 | 1.2500 | 1.772499 | 49.61 |
| 16 | 469.7053 | (variable) | | |
| 17 | 281.3799 | 5.5016 | 1.719995 | 50.23 |
| 18 | −32.3692 | 1.4000 | 1.903660 | 31.27 |
| 19 | −66.3391 | (variable) | | |
| 20 (stop) | ∞ | 0.4000 | | |
| 21 | 50.0344 | 5.0000 | 1.804000 | 46.57 |
| 22 | 3065.4479 | 0.3000 | | |
| 23 | 34.9606 | 5.5000 | 1.497820 | 82.52 |
| 24 | −144.0312 | 1.9970 | 1.903660 | 31.27 |
| 25 | 40.4149 | 14.5500 | | |
| 26 | ∞ | 2.4000 | | |
| 27 | 97.9375 | 4.1737 | 1.805181 | 25.43 |
| 28 | −42.1393 | 1.2000 | 1.603112 | 60.67 |
| 29 | 67.8195 | 4.0000 | | |
| 30 | −198.3164 | 1.2000 | 2.000690 | 25.45 |
| 31 | 62.5639 | 0.9000 | | |
| 32 | ∞ | 2.0016 | | |
| 33 | 84.5408 | 4.6000 | 1.589130 | 61.16 |
| 34 | −84.5408 | 0.7000 | | |
| 35 | 71.0475 | 5.0000 | 1.712995 | 53.88 |
| 36 | −71.0472 | 5.7414 | | |
| 37 | −42.5291 | 2.0400 | 1.834000 | 37.16 |
| 38 | −165.3314 | (Bf) | | |
| IP | ∞ | | | |

(Aspheric Surface Data)
11th surface

κ = 1.4043
A4 = −5.20200E−07
A6 = −5.33060E−10

(Various Data)
Zoom ratio: 2.745

| | W | M | T |
|---|---|---|---|
| f = | 71.40 | 103.00 | 196.00 |
| FNO = | 4.1 | 4.1 | 4.1 |
| ω = | 17.233 | 11.734 | 6.106 |
| Y = | 21.6 | 21.6 | 21.6 |
| TL = | 209.8 | 209.8 | 209.8 |
| Bf = | 64.0 | 64.0 | 64.0 |
| d7 | 1.500 | 1.500 | 1.500 |
| d9 | 1.950 | 19.263 | 39.917 |
| d16 | 20.437 | 16.356 | 1.200 |
| d19 | 20.686 | 7.426 | 1.900 |

(Data for Short Object Distance)

| | W | M | T |
|---|---|---|---|
| β | −0.06 | −0.09 | −0.16 |
| d0 | 1273.46 | 1273.49 | 1273.52 |
| d7 | 8.211 | 8.211 | 8.211 |
| d9 | 1.950 | 19.263 | 39.917 |
| d16 | 20.437 | 16.356 | 1.200 |
| d19 | 20.686 | 7.426 | 1.900 |

(Data for Zoom Lens Group)

| Group | FLS | FL |
|---|---|---|
| 1 | 1 | 106.4334 |
| 1A | 1 | 89.655 |
| 1B | 8 | −500.000 |
| 2 | 10 | −28.009 |
| 3 | 17 | 95.490 |
| 4 | 20 | 81.135 |

(Values Associated with Conditions)

(1) |fA/fB| = 0.179
(2) |fA/fX| = 0.842
(3) |fB/fX| = 4.698

Figure 8A:
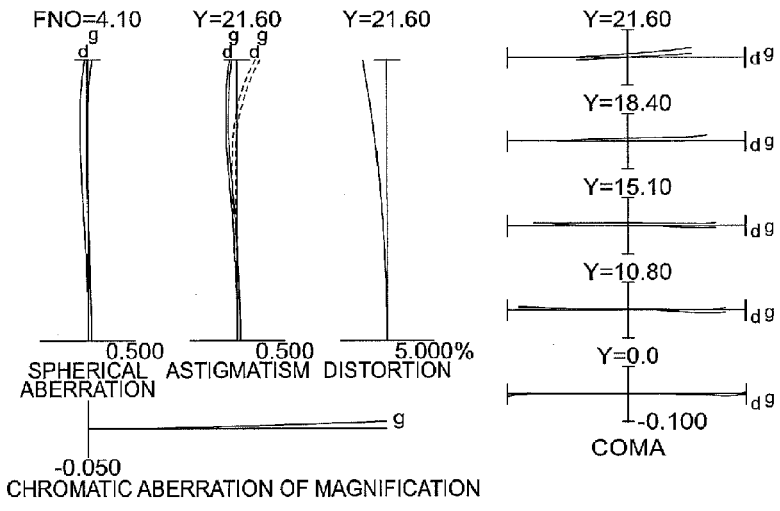
FIGS. 8A, 8B and 8C are aberration diagrams of the zoom optical system according to the third example in the state in which the zoom optical system is focused on an object point at infinity, where
Figure 8B:
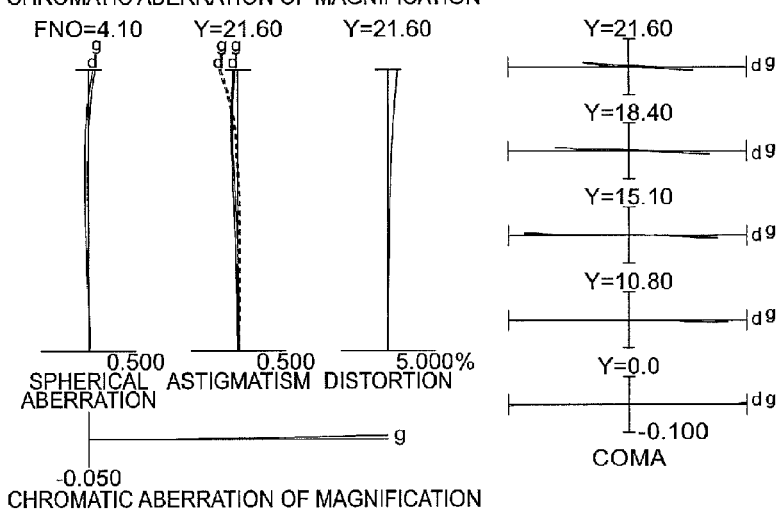
Figure 8C:
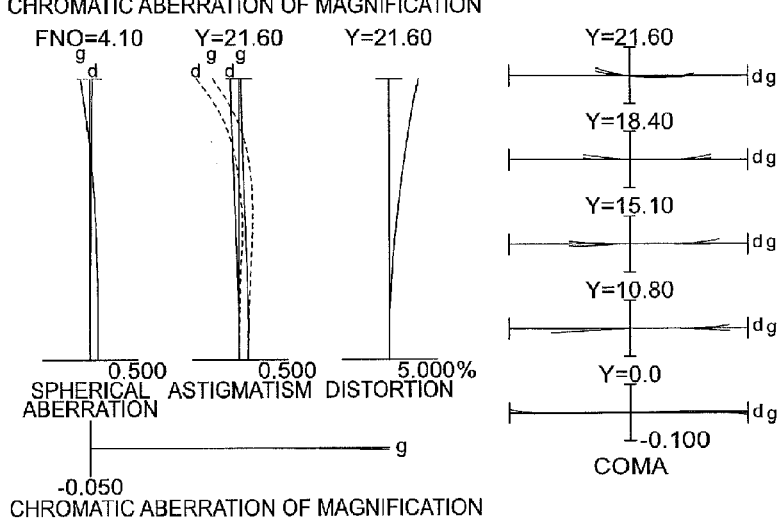

FIGS. 8A, 8B and 8C show aberrations of the zoom optical system according to the third example in the state in which the optical system is focused on an object point at infinity, where FIG. 8A shows aberrations at the wide angle end of the focal length range, FIG. 8B shows aberrations at the intermediate focal length position, and FIG. 8C shows aberrations at the telephoto end of the focal length range.

Figure 9A:
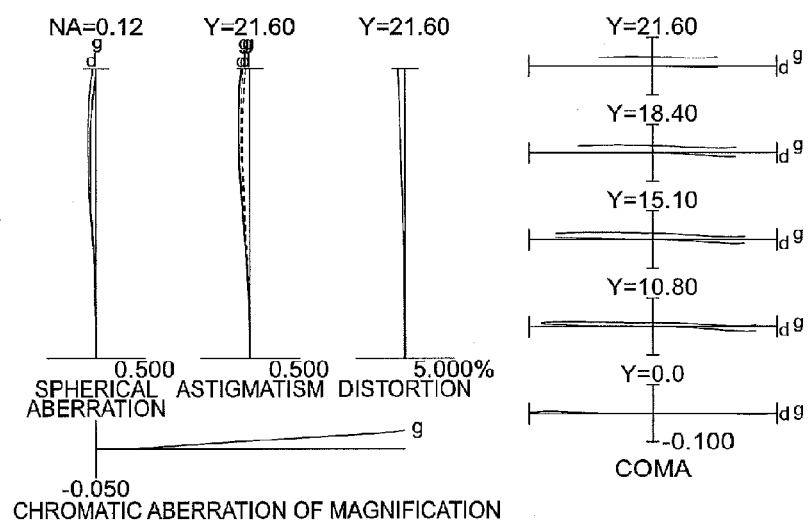
FIGS. 9A and 9B show aberrations of the zoom optical system according to the third example in the state in which the optical system is focused on an object point at a short distance, where
Figure 9B:
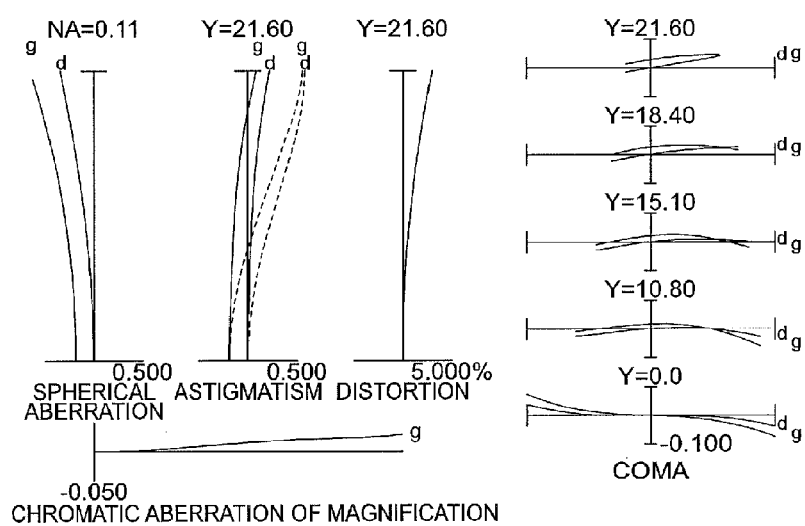

FIGS. 9A and 9B show aberrations of the zoom optical system according to the third example in the state in which the optical system is focused on an object point at a short distance, where FIG. 9A shows aberrations at the wide angle end of the focal length range, and FIG. 9B shows aberrations at the telephoto end of the focal length range.

From the aberration diagrams, it can be seen that aberrations of the zoom optical system according to the third example are excellently corrected throughout the focal length range from the wide angle end to the telephoto end, and excellent optical performance is achieved.

Fourth Example

Figure 10:
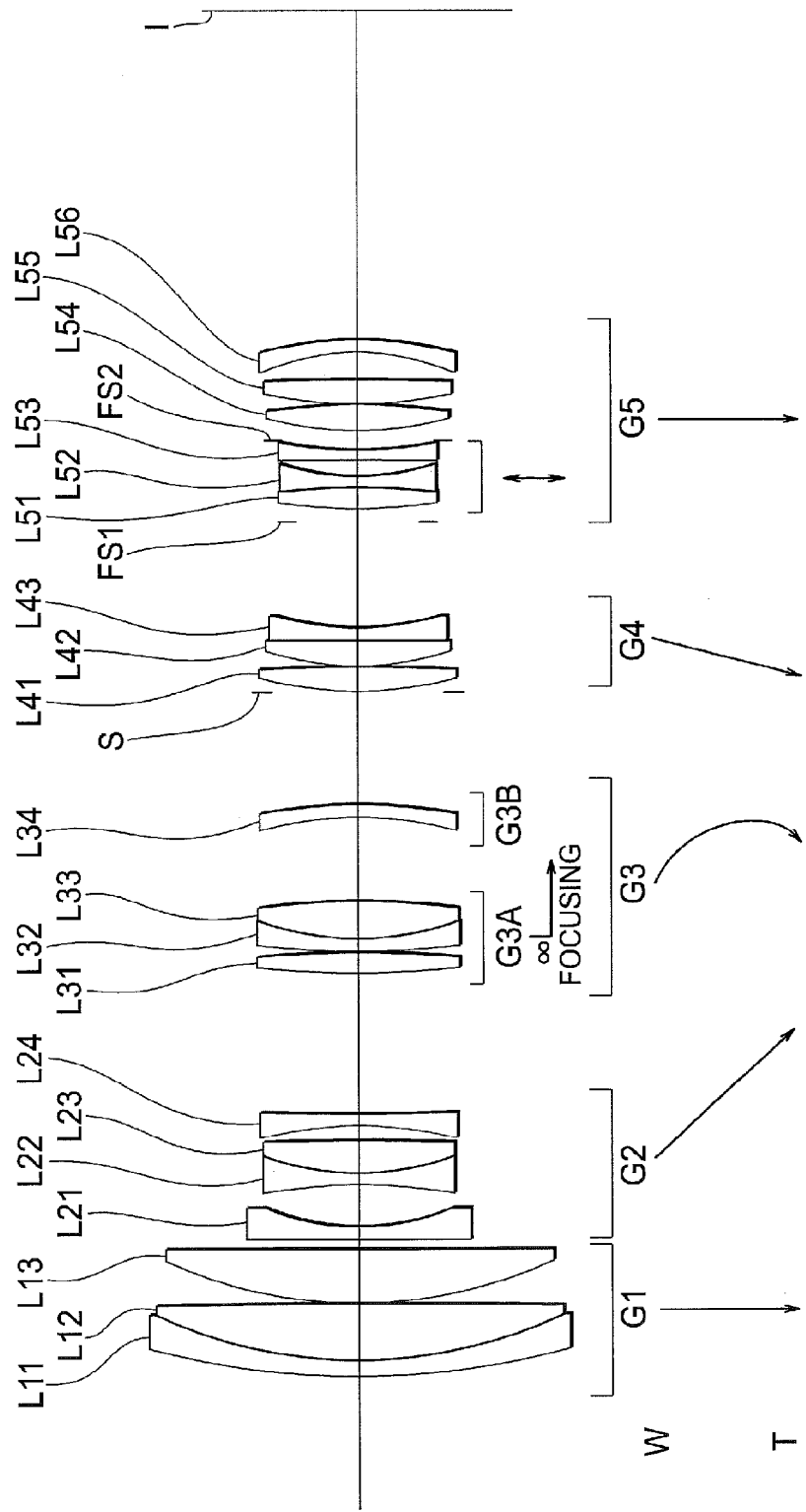
FIG. 10 is a cross sectional view showing the configuration of a zoom optical system according to a fourth example.

FIG. 10 is a cross sectional view showing the configuration of a zoom optical system according to a fourth example.

As shown in FIG. 10, the zoom optical system according to the fourth example includes, in order from its object side along its optical axis, a first lens group G1 having a positive refracting power, a second lens group G2 having a negative refracting power, a third lens group G3 having a positive refracting power, a fourth lens group G4 having a positive refracting power, and a fifth lens group G5 having a negative refracting power. The third lens group G3 is composed of a front group G3A having a positive refracting power and a rear group G3B having a negative refracting power. An aperture stop S is provided in the fourth lens group G4, and the aperture stop S is the element that is located closest to the object side in the fourth lens group G4.

During zooming from the wide angle end state W to the telephoto end state T, the first lens group G1 is fixed, the second lens group G2 moves monotonically toward the image side, the third lens group G3 moves, the fourth lens group G4 moves monotonically toward the object side, and the fifth lens group G5 is fixed, relative to the image plane I so that the distance between the first lens group G1 and the second lens group G2 increases, that the distance between the second lens group G2 and the third lens group G3 changes, that the distance between the third lens group G3 and the fourth lens group G4 changes, and that the distance between the fourth lens group G4 and the fifth lens group G5 changes. In addition, during zooming from the wide angle end state W to the telephoto end state T, the distance between the front group G3A in the third lens group G3 and the rear group G3B in the third lens group G3 does not change.

Focusing operation from an object at infinity to an object at a short distance is performed by moving the front group G3A in the third lens group G3 toward the image side along the optical axis.

The first lens group G1 includes, in order from the object side along the optical axis, a cemented lens made up of a negative meniscus lens L11 having a convex surface facing the object side and a biconvex lens L12, and a positive meniscus lens L13 having a convex surface facing the object side.

The second lens group G2 includes, in order from the object side along the optical axis, a negative meniscus lens L21 having a convex surface facing the object side, a cemented lens made up of a biconcave lens L22 and a biconvex lens L23, and a biconcave lens L24.

The front group G3A in the third lens group G3 includes, in order from the object side along the optical axis, a biconvex lens L31, and a cemented lens made up of a negative meniscus lens L32 having a convex surface facing the object side and a biconvex lens L33.

The rear group G3B in the third lens group G3 includes a negative meniscus lens L34 having a concave surface facing the object side.

The fourth lens group G4 includes, in order from the object side along the optical axis, a biconvex lens L41, and a cemented lens made up of a biconvex lens L42 and a biconcave lens L43.

The fifth lens group G5 includes, in order from the object side along the optical axis, a first fixed stop FS1, a cemented lens made up of a biconvex lens L51 and a biconcave lens L52, a biconcave lens L53, a second fixed stop FS2, a biconvex lens L54, a biconvex lens L55, and a negative meniscus lens L56 having a concave surface facing the object side. The rays emerging from the negative meniscus lens L56 are focused on the image plane I.

Hand-shake compensation (or vibration reduction) is provided by moving a portion of the fifth lens group G5 or the cemented lens made up of the biconvex lens L51 and the biconcave lens L52 and the biconcave lens L53 in such a way as to have a movement component in a direction perpendicular to the optical axis.

Numerical data for the zoom optical system according to the fourth example is presented in Table 4 below.

TABLE 4

(Surface Data)

| SN | r | d | nd | νd |
|---|---|---|---|---|
| OP | ∞ | ∞ | | |
| 1 | 105.5853 | 2.5000 | 1.830790 | 33.24 |
| 2 | 61.8846 | 8.8000 | 1.497820 | 82.52 |
| 3 | −2502.4443 | 0.1000 | | |
| 4 | 61.0485 | 8.5000 | 1.497820 | 82.52 |
| 5 | 3247.1190 | (variable) | | |
| 6 | 1271.6072 | 2.0000 | 1.812260 | 39.72 |
| 7 | 32.2961 | 6.6220 | | |
| 8 | −72.5848 | 1.8000 | 1.487588 | 70.50 |
| 9 | 36.7994 | 5.0132 | 1.846586 | 23.78 |
| 10 | −408.4276 | 2.4231 | | |
| 11 | −51.3707 | 1.8000 | 1.729273 | 54.64 |
| 12 | 460.3188 | (variable) | | |
| 13 | 133.8896 | 3.2225 | 1.729405 | 54.63 |
| 14 | −138.3727 | 0.1000 | | |
| 15 | 123.3360 | 2.0000 | 1.834000 | 37.16 |
| 16 | 39.9361 | 5.9000 | 1.603001 | 65.46 |
| 17 | −99.2430 | (variable) | | |
| 18 | −50.0000 | 2.0000 | 1.755199 | 27.51 |
| 19 | −69.2551 | (variable) | | |
| 20 (stop) | ∞ | 0.1000 | | |
| 21 | 53.4321 | 3.7929 | 1.716315 | 55.44 |
| 22 | −237.0413 | 0.1000 | | |
| 23 | 41.6389 | 4.0000 | 1.497820 | 82.52 |
| 24 | −6903.8689 | 2.0000 | 1.849124 | 31.49 |
| 25 | 44.4196 | (variable) | | |
| 26 | ∞ | 2.0000 | | |
| 27 | 71.7392 | 3.4000 | 1.808090 | 22.79 |
| 28 | −105.2565 | 1.6000 | 1.692515 | 55.47 |
| 29 | 34.4941 | 2.6264 | | |
| 30 | −771.7031 | 1.6000 | 1.840743 | 30.47 |
| 31 | 64.2379 | 1.5000 | | |
| 32 | ∞ | 1.5000 | | |
| 33 | 47.7790 | 4.1209 | 1.514290 | 65.99 |
| 34 | −96.1820 | 0.1000 | | |
| 35 | 62.0757 | 3.9000 | 1.504175 | 66.58 |
| 36 | −311.1825 | 4.4088 | | |
| 37 | −33.3826 | 1.9000 | 1.800999 | 34.96 |
| 38 | −53.0369 | (Bf) | | |
| IP | ∞ | | | |

(Various Data)
Zoom ratio: 2.750

| | W | M | T |
|---|---|---|---|
| f = | 71.23 | 106.79 | 195.89 |
| FNO = | 4.25 | 4.25 | 4.25 |
| ω = | 17.157 | 11.303 | 6.110 |
| Y = | 21.6 | 21.6 | 21.6 |
| TL = | 214.5 | 214.5 | 214.5 |
| Bf = | 51.8 | 51.8 | 51.8 |
| d5 | 1.500 | 17.629 | 33.797 |
| d12 | 22.173 | 15.365 | 0.807 |
| d17 | 13.158 | 13.158 | 13.158 |

TABLE 4-continued

| d19 | 17.641 | 5.443 | 0.700 |
|---|---|---|---|
| d25 | 16.778 | 19.655 | 22.778 |

(Data for Short Object Distance)

| | W | M | T |
|---|---|---|---|
| β | −0.08 | −0.11 | −0.17 |
| d0 | 775.71 | 775.71 | 775.71 |
| d5 | 1.500 | 17.629 | 33.797 |
| d12 | 24.729 | 20.091 | 12.703 |
| d17 | 10.603 | 8.433 | 1.273 |
| d19 | 17.641 | 5.443 | 0.700 |
| d25 | 16.778 | 19.655 | 22.778 |

(Data for Zoom Lens Group)

| Group | FLS | FL |
|---|---|---|
| 1 | 1 | 94.857 |
| 2 | 6 | −25.937 |
| 3 | 13 | 69.658 |
| 3A | 13 | 57.563 |
| 3B | 18 | −249.271 |
| 4 | 20 | 88.043 |
| 5 | 26 | −412.603 |

(Values Associated with Conditions)

(1) |fA/fB| = 0.231
(2) |fA/fX| = 0.826
(3) |fB/fX| = 3.579

Figure 11A:
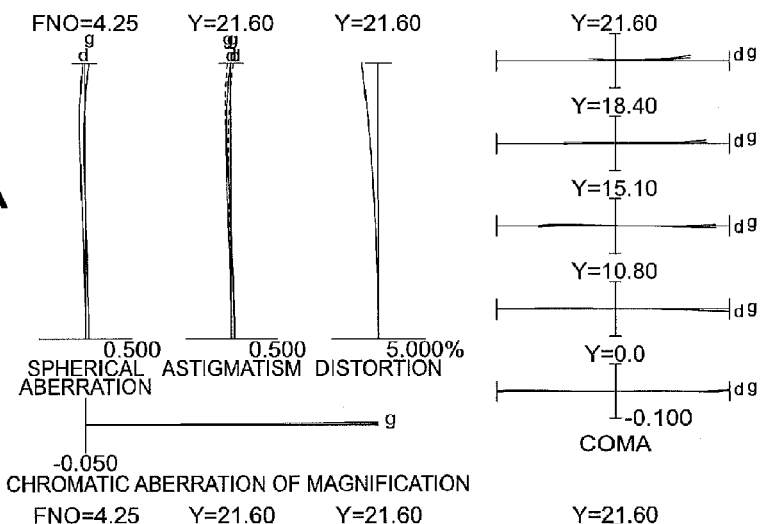
FIGS. 11A, 11B and 11C are aberration diagrams of the zoom optical system according to the fourth example in the state in which the zoom optical system is focused on an object point at infinity, where
Figure 11B:
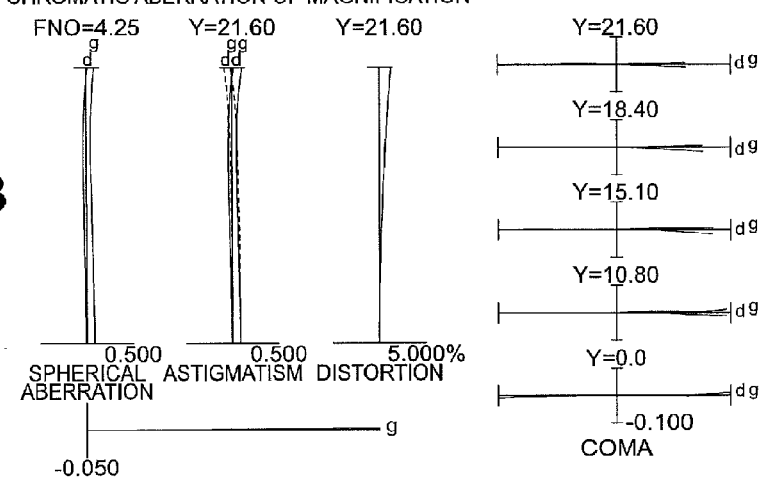
Figure 11C:
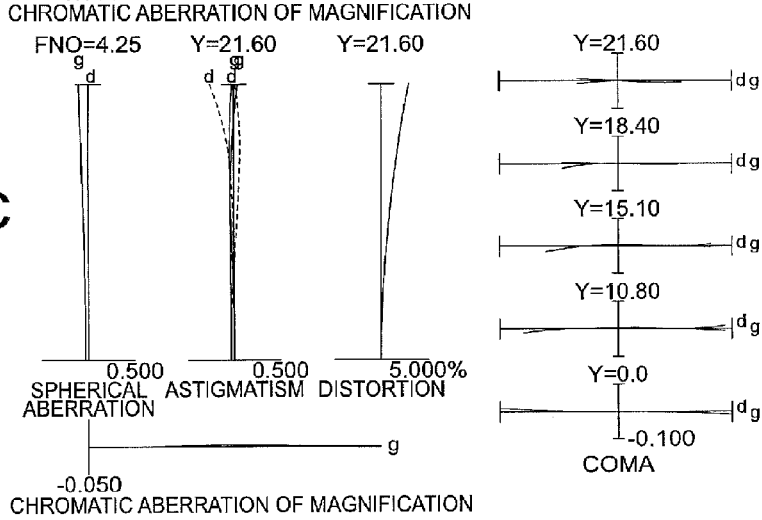

FIGS. 11A, 11B and 11C show aberrations of the zoom optical system according to the fourth example in the state in which the optical system is focused on an object point at infinity, where FIG. 11A shows aberrations at the wide angle end of the focal length range, FIG. 11B shows aberrations at the intermediate focal length position, and FIG. 11C shows aberrations at the telephoto end of the focal length range.

Figure 12A:
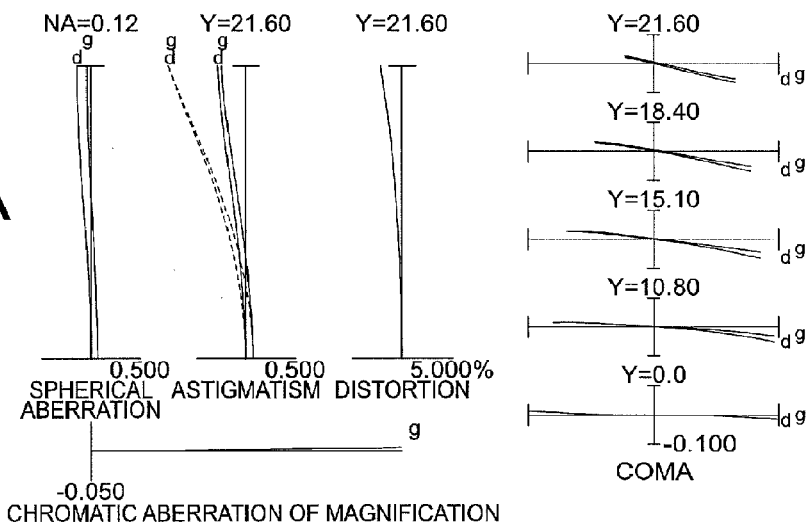
FIGS. 12A and 12B show aberrations of the zoom optical system according to the fourth example in the state in which the optical system is focused on an object point at a short distance, where
Figure 12B:
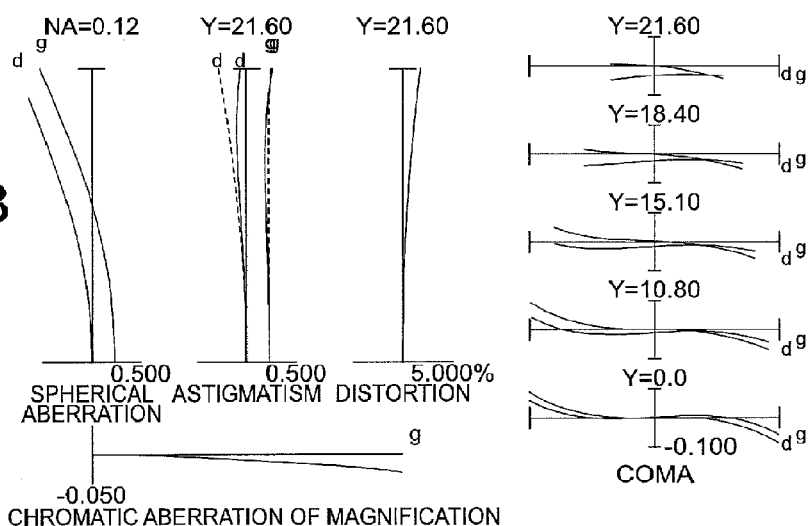

FIGS. 12A and 12B show aberrations of the zoom optical system according to the fourth example in the state in which the optical system is focused on an object point at a short distance, where FIG. 12A shows aberrations at the wide angle end of the focal length range, and FIG. 12B shows aberrations at the telephoto end of the focal length range.

From the aberration diagrams, it can be seen that aberrations of the zoom optical system according to the fourth example are excellently corrected throughout the focal length range from the wide angle end to the telephoto end, and excellent optical performance is achieved.

As described above, zoom optical systems having good optical performance can be provided according to the present embodiment.

A camera equipped with a zoom optical system according to the present embodiment will be described. In the following, a camera equipped with the zoom optical system according to the first example will be described. The following description also applies to a camera equipped with the zoom optical system according to any one of the other examples.

Figure 13:
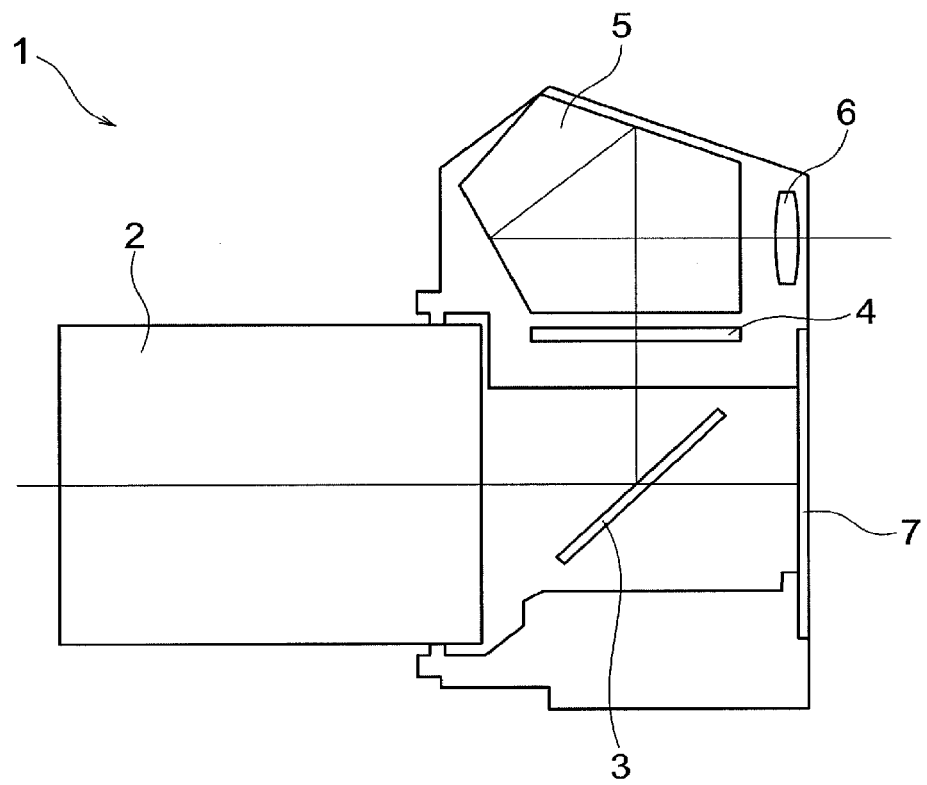
FIG. 13 is a cross sectional view schematically showing the construction of a camera equipped with the zoom optical system according to the first example.

FIG. 13 is a cross sectional view schematically showing the construction of a camera equipped with the zoom optical system according to the first example.

FIG. 13 shows a digital single lens reflex camera 1 equipped with the zoom optical system according to the first example as the taking lens 2. In this camera 1, light coming from an object (not shown) is condensed by the taking lens 2 and focused on a focusing screen 4 through a quick-return mirror 3. The light focused on the focusing screen 4 is guided to an eyepiece lens 6 after reflected plural times in a pentaprism 5. Thus, a user or photographer can see an erected image of the object through the eyepiece lens 6.

As a shutter release button (not shown) is depressed by the photographer, the quick-return mirror 3 is removed out of the optical path to allow light from the object (not shown) to reach an image pickup element 7. Thus, light from the object is picked up by the image pickup element 7 and recorded as an object image in a memory (not shown). The photographer takes an image of an object with the camera 1 in this way.

With the use of the zoom optical system according to the first example as the taking lens 2 of the camera 1, the camera 1 can have high optical performance.

In the following, a method of manufacturing a zoom optical system according to the present application will be described.

Figure 14:
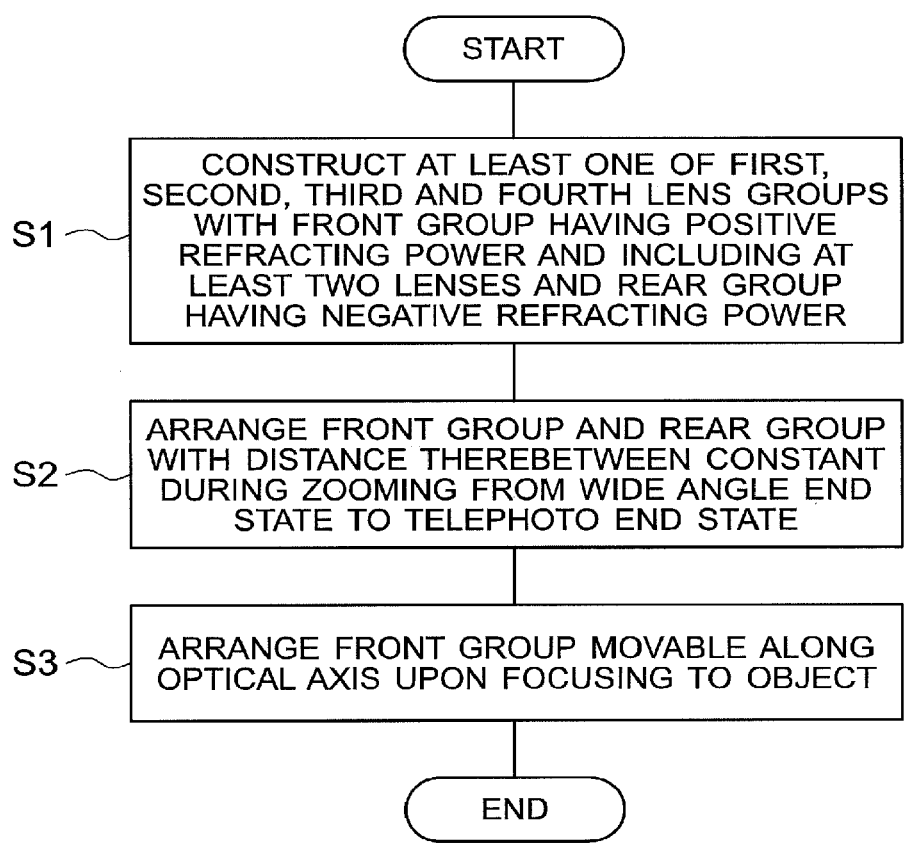
FIG. 14 is a flow chart of a method of manufacturing a zoom optical system according to the present invention.

FIG. 14 is a flow chart of the method of manufacturing the zoom optical system according to the present application.

The method of manufacturing a zoom optical system according to the present invention is a method of manufacturing a zoom optical system including, in order from the object side along the optical axis, a first lens group having a positive refracting power, a second lens group having a negative refracting power, a third lens group having a positive refracting power, and a fourth lens group having a positive refracting power. The method comprises steps S1, S2 and S3 shown in FIG. 14.

Step S1: Constructing at least one of the first, second, third and fourth lens groups with a front group having a positive refracting power including at least two lenses and a rear group having a negative refracting power.

Step S2: Arranging the front group and the rear group in such a way that the distance between the front group and the rear group will not change during zooming from the wide angle end state to the telephoto end state.

Step 3: Arranging the front group in such a way as to be movable along the optical axis upon focusing onto an object.

With the method of manufacturing a zoom optical system according to the present invention, a zoom optical system having good optical performance can be manufactured.

One or more of the following features may be adopted as long as the optical performance of the zoom optical system is not deteriorated.

Although the optical systems according to the present application have a four-group configuration or five-group configuration, the present invention can also be applied to optical systems having other lens group configurations such as six-group configuration. Alternatively, a lens or lens group may be added to the optical system as the lens or the lens group located closest to the object side, or as the lens or the lens group located closest to the image side. The term "lens group" refers to a unit that includes at least one lens and is separated from another unit by an air gap that changes during zooming.

One or plurality of lens groups or a partial lens group may serve as a focusing lens group(s) that is moved along the optical axis for focusing from an object at infinity to an object at a short distance. The focusing lens group may also be used in an auto-focus optical system suitably with motor driving (using, for example, an ultrasonic motor) for auto-focusing. In particular it is preferred that the first or third lens group serve as the focusing lens group.

One lens group or partial lens group may serve as a vibration reduction lens group that is moved in such a way as to have a movement component in a direction perpendicular to the optical axis or moved rotationally (or swung) in a direction in a plane containing the optical axis to reduce image blur caused by hand shake. In particular it is preferred that at least a part of the fourth lens group serve as the vibration reduction lens group.

The lens surfaces may be spherical, planar, or aspheric.

Spherical or planar lens surfaces are preferred in facilitating machining, assembly and adjustment and preventing deterioration in the optical performance caused by errors in machining, assembly and adjustment. In addition, they are preferred because even when the image plane is displaced, a large deterioration in the image quality is not caused if the lens surfaces are spherical or planar.

Aspheric surfaces, if any, may be produced by grinding. Alternatively, they may be glass mold aspheric surfaces produced by shaping glass with a mold or composite aspheric surfaces produced by molding resin on a glass surface. The lens surfaces may be diffractive surfaces. Gradient index lenses (GRIN lenses) and plastic lenses may also be used.

It is preferred that the aperture stop be disposed near the fourth lens group. Alternatively, a lens frame may be adapted to serve as an aperture stop to eliminate a separate aperture stop.

Anti-reflection coating achieving high transmittance over a wide wavelength range may be applied to the lens surfaces to achieve excellent optical performance with high contrast and reduced lens flares and ghost images.

The zoom optical systems according to the embodiment have a zoom ratio within a range of approximately 2 to 5.

In the zoom optical systems according to the embodiment, it is preferred that the first lens group include two positive lens components.

In the zoom optical systems according to the embodiment, it is preferred that the second lens group include three negative lens components.

In the zoom optical systems according to the embodiments, it is preferred that the third lens group include one positive lens component.

In the zoom optical systems according to the embodiments, it is preferred that the fourth lens group include one positive lens component and one negative lens component.

In the zoom optical systems according to the embodiment, it is preferred that the fifth lens group include one positive lens component and one negative lens component.

Although various components of the embodiment have been described to facilitate understanding of the present invention, the present invention is not limited to them.

What is claimed is:

1. A zoom optical system comprising, in order from its object side along its optical axis:
   a first lens group having a positive refracting power;
   a second lens group having a negative refracting power;
   a third lens group having a positive refracting power; and
   a fourth lens group having a positive refracting power, wherein
   at least one of said first, second, third and fourth lens groups comprises a front group having a positive refracting power including at least two lenses and a rear group having a negative refracting power, and
   during zooming from the wide angle end state to the telephoto end state, the distance between said front group and said rear group does not change, and during focusing onto an object, said front lens group moves along the optical axis.

2. A zoom optical system according to claim 1, wherein said first lens group is fixed relative to an image plane during zooming from the wide angle end state to the telephoto end state.

3. A zoom optical system according to claim 1, wherein the zoom optical system satisfies the following condition:

$$0.050<|fA/fB|<0.950,$$

where fA is the focal length of said front group, and fB is the focal length of said rear group.

4. A zoom optical system according to claim 1, wherein the lens group located closest to the image side is fixed relative to an image plane during zooming from the wide angle end state to the telephoto end state.

5. A zoom optical system according to claim 1, at least a part of said fourth lens group is movable with a movement component in a direction perpendicular to the optical axis.

6. A zoom optical system according to claim 1, wherein the zoom optical system satisfies the following condition:

$$0.050<|fA/fX|<0.950,$$

where fA is the focal length of said front group, and fX is the focal length of said at least one lens group.

7. A zoom optical system according to claim 1, wherein the zoom optical system satisfies the following condition:

$$1.200<|fB/fX|<50.000,$$

where fB is the focal length of said rear group, and fX is the focal length of said at least one lens group.

8. A zoom optical system according to claim 1, wherein the lens group including said front group and said rear group is said third lens group.

9. A zoom optical system according to claim 1, wherein the lens group including said front group and said rear group is said first lens group.

10. A zoom optical system according to claim 1, wherein said front group comprises at least one positive lens and at least one negative lens.

11. A zoom optical system according to claim 1, wherein during zooming from the wide angle end state to the telephoto end state, the distance between said first lens group and said second lens group increases, the distance between said second lens group and said third lens group changes, and the distance between said third lens group and said fourth lens group changes.

12. An optical apparatus having a zoom optical system according to claim 1.

13. A method of manufacturing a zoom optical system including, in order from its object side along its optical axis, a first lens group having a positive refracting power, a second lens group having a negative refracting power, a third lens group having a positive refracting power and a fourth lens group having a positive refracting power, the method comprising:
   constructing at least one of said first, second, third and fourth lens groups with a front group having a positive refracting power including at least two lenses and a rear group having a negative refracting power;
   arranging said front group and said rear group in such a way that the distance between said front group and said rear group will not change during zooming from the wide angle end state to the telephoto end state; and
   arranging said front group in such a way as to be movable along the optical axis upon focusing onto an object.

14. A method of manufacturing a zoom optical system according to claim 13, further comprising a step of arranging said first lens group in such a way to be fixed relative to an image plane during zooming from the wide angle end state to the telephoto end state.

15. A method of manufacturing a zoom optical system according to claim 13, wherein the zoom optical system satisfies the following condition:

$$0.050 < |fA/fB| < 0.950,$$

where fA is the focal length of said front group, and fB is the focal length of said rear group.

16. A method of manufacturing a zoom optical system according to claim 13, wherein the zoom optical system satisfies the following condition:

$$0.050 < |fA/fX| < 0.950,$$

where fA is the focal length of said front group, and fX is the focal length of said at least one lens group.

17. A method of manufacturing a zoom optical system according to claim 13, wherein the zoom optical system satisfies the following condition:

$$1.200 < |fB/fX| < 50.000,$$

where fB is the focal length of said rear group, and fX is the focal length of said at least one lens group.

* * * * *